United States Patent
Yoshida et al.

(10) Patent No.: US 8,712,613 B2
(45) Date of Patent: Apr. 29, 2014

(54) CONTROL DEVICE

(75) Inventors: Takashi Yoshida, Anjo (JP); Yomei Hakumura, Toyokawa (JP); Saoto Tsuchiya, Okinawa (JP); Hiroaki Kioka, Nishio (JP)

(73) Assignee: Aisin AW Co., Ltd., Anjo (JP)

( * ) Notice: Subject to any disclaimer, the term of this patent is extended or adjusted under 35 U.S.C. 154(b) by 561 days.

(21) Appl. No.: 13/045,079

(22) Filed: Mar. 10, 2011

(65) Prior Publication Data

US 2011/0246008 A1      Oct. 6, 2011

(30) Foreign Application Priority Data

Mar. 31, 2010   (JP) ................................ 2010-084255

(51) Int. Cl.
*B60W 10/06*   (2006.01)

(52) U.S. Cl.
USPC .......... 701/22; 701/113; 477/181; 180/65.28; 903/905

(58) Field of Classification Search
USPC .................. 701/22, 99, 101, 113, 102, 110; 180/65.1, 65.21, 65.225, 65.23, 65.25, 180/65.28, 65.285; 903/902, 905, 906, 946; 477/3, 5, 6, 8, 166, 173, 181
See application file for complete search history.

(56) References Cited

U.S. PATENT DOCUMENTS

| | | | |
|---|---|---|---|
| 7,207,404 B2* | 4/2007 | Ito et al. | 180/65.28 |
| 7,273,119 B2* | 9/2007 | Tsuneyoshi et al. | 180/65.28 |
| 7,360,616 B2* | 4/2008 | Schiele | 180/65.265 |
| 8,142,328 B2* | 3/2012 | Reuschel | 477/6 |
| 2001/0020789 A1* | 9/2001 | Nakashima | 290/40 C |

(Continued)

FOREIGN PATENT DOCUMENTS

| | | |
|---|---|---|
| JP | A-2005-162145 | 6/2005 |
| JP | A-2006-132448 | 5/2006 |

(Continued)

OTHER PUBLICATIONS

Apr. 12, 2011 International Search Report issued in PCT/JP2011/052713 (with translation).

*Primary Examiner* — Thomas Black
*Assistant Examiner* — Ce Li
(74) *Attorney, Agent, or Firm* — Oliff PLC

(57) ABSTRACT

A control device controlling a hybrid vehicle drive apparatus that includes an internal combustion engine, a rotary electric machine drivingly connected to a wheel and a clutch selectively drivingly connecting the internal combustion engine with the rotary electric machine. The control device performs control such that, when a start request of the internal combustion engine is issued in the state in which the clutch is released and combustion of the internal combustion engine is stopped, a rotational speed of the internal combustion engine is raised to a rotational speed of the rotary electric machine by transmitting driving torque of the rotary electric machine to the internal combustion engine by increasing a torque transfer capacity of the clutch, and, after the rotational speed of the internal combustion engine is synchronized with the rotational speed of the rotary electric machine, the combustion of the internal combustion engine is started.

3 Claims, 9 Drawing Sheets

(56) References Cited

U.S. PATENT DOCUMENTS

| | | | |
|---|---|---|---|
| 2005/0121239 A1* | 6/2005 | Tsuneyoshi et al. | 180/65.2 |
| 2007/0078039 A1* | 4/2007 | Antony et al. | 477/5 |
| 2007/0087894 A1* | 4/2007 | Tsuneyoshi et al. | 477/3 |
| 2008/0064560 A1* | 3/2008 | Popp et al. | 477/5 |
| 2008/0182722 A1* | 7/2008 | Colvin et al. | 477/180 |
| 2009/0111645 A1* | 4/2009 | Heap et al. | 477/5 |
| 2010/0018790 A1* | 1/2010 | Allgaier | 180/65.265 |
| 2010/0151990 A1* | 6/2010 | Seel | 477/5 |
| 2010/0204005 A1* | 8/2010 | Kaltenbach | 477/5 |
| 2010/0300391 A1* | 12/2010 | Stefani et al. | 123/179.1 |
| 2011/0118078 A1* | 5/2011 | Kraska et al. | 477/5 |

FOREIGN PATENT DOCUMENTS

| | | |
|---|---|---|
| JP | A-2006-306209 | 11/2006 |
| JP | A-2007-112258 | 5/2007 |
| JP | A-2009-35188 | 2/2009 |

* cited by examiner $\omega e < \omega m$ $\omega e = \omega m$

CONTROL DEVICE

INCORPORATION BY REFERENCE

The disclosure of Japanese Patent Application No. 2010-084255 filed on Mar. 31, 2010 including the specification, drawings and abstract is incorporated herein by reference in its entirety.

BACKGROUND OF THE INVENTION

The present invention relates to a control device that controls a hybrid vehicle drive apparatus provided with an internal combustion engine, a rotary electric machine drivingly connected to wheels, and a clutch selectively drivingly connecting the internal combustion engine with the rotary electric machine.

DESCRIPTION OF THE RELATED ART

Hybrid vehicles are in practical use that can achieve improvement in fuel economy and reduction in exhaust gas of an internal combustion engine by using a combination of the internal combustion engine and a rotary electric machine. As an example of a hybrid vehicle drive apparatus used for such hybrid vehicles, Japanese Patent Application Publication No. JP-A-2005-162142 described below discloses a hybrid vehicle drive apparatus provided with an internal combustion engine, a rotary electric machine drivingly connected to wheels, and a clutch selectively drivingly connecting the internal combustion engine with the rotary electric machine. In the hybrid vehicle drive apparatus such as mentioned above, the clutch is released, and combustion and rotation of the internal combustion engine are stopped, so as to perform electric drive in which a vehicle runs by output torque of the rotary electric machine. When a start request of the internal combustion engine is issued during the electric drive, rotation of the rotary electric machine is transmitted to the internal combustion engine by increasing a torque transfer capacity of the clutch, thereby increasing the rotational speed of the internal combustion engine so as to start the internal combustion engine.

According to the technology disclosed in Japanese Patent Application Publication No. JP-A-2005-162142, the rotational speed of the internal combustion engine is raised to the rotational speed of the rotary electric machine after the combustion of the internal combustion engine is started, and then, the clutch is fully engaged. After fully engaging the clutch, parallel drive is performed in which the vehicle is driven by output torque of the internal combustion engine and the rotary electric machine.

SUMMARY OF THE INVENTION

However, according to the technology disclosed in Japanese Patent Application Publication No. JP-A-2005-162142, the combustion of the internal combustion engine starts immediately after the rotational speed of the internal combustion engine reaches a rotational speed that allows the combustion to start. That is, according to the technology disclosed in Japanese Patent Application Publication No. JP-A-2005-162142, the combustion of the internal combustion engine is started at a lower rotational speed than the rotational speed of the rotary electric machine, and, after starting the combustion of the internal combustion engine, the rotational speed of the internal combustion engine is raised to the rotational speed of the rotary electric machine, whereby the clutch is fully engaged. Until the clutch is fully engaged, torque corresponding to the torque transfer capacity of the clutch is transmitted in the direction from the rotary electric machine side toward the internal combustion engine side. On the other hand, at the same time as the clutch is fully engaged, the output torque of the internal combustion engine is transmitted in the direction from the internal combustion engine side toward the rotary electric machine side. Therefore, the direction of torque transmission of the clutch is reversed between before and after the full engagement of the clutch, and the output torque of the internal combustion engine is thereby transmitted to the rotary electric machine side suddenly (in a stepwise manner). Consequently, there is a problem of occurrence of torque shock.

Thus, it is desired to provide a control device that is capable of suppressing torque shock occurring between before and after engagement of a clutch, when an internal combustion engine is started by transmitting driving torque of a rotary electric machine to the internal combustion engine, in the state in which the clutch selectively drivingly connecting the internal combustion engine with the rotary electric machine is released and combustion of the internal combustion engine is stopped.

In order to achieve the object described above, a control device according to a first aspect of the present invention controlling a hybrid vehicle drive apparatus that includes an internal combustion engine, a rotary electric machine drivingly connected to a wheel, and a clutch selectively drivingly connecting the internal combustion engine with the rotary electric machine, has a characteristic structure in which the control device performs control such that, when a start request of the internal combustion engine is issued in the state in which the clutch is released and combustion of the internal combustion engine is stopped, a rotational speed of the internal combustion engine is raised to a rotational speed of the rotary electric machine by transmitting driving torque of the rotary electric machine to the internal combustion engine by increasing a torque transfer capacity of the clutch, and, after the rotational speed of the internal combustion engine is synchronized with the rotational speed of the rotary electric machine, the combustion of the internal combustion engine is started.

According to the first aspect as described above, the combustion of the internal combustion engine is started after the rotational speed of the internal combustion engine is synchronized with the rotational speed of the rotary electric machine by increasing the torque transfer capacity of the clutch and the clutch is fully engaged. Consequently, output torque of the internal combustion engine is maintained at negative torque, such as friction and pumping torque, produced while the combustion is stopped, throughout before and after the full engagement of the clutch. This makes it possible to transmit the torque in the clutch in the direction from the rotary electric machine side toward the internal combustion engine side both before and after the full engagement of the clutch, and thus, the torque can be transmitted in the same direction before and after the full engagement of the clutch. Accordingly, the direction of torque transmission can be prevented from being reversed between before and after the full engagement of the clutch, thereby enabling to suppress torque shock occurring between before and after the full engagement of the clutch.

The magnitude of the negative output torque is relatively small while the combustion of the internal combustion engine is stopped. Consequently, the clutch can complete the engagement with a smaller torque transfer capacity than that required in the combustion state of the internal combustion engine. Therefore, even if a stepwise torque difference in the same direction of transmission occurs between before and after the full engagement of the clutch, the magnitude of the difference is relatively small. As a result, the torque shock occurring between before and after the full engagement of the clutch can be suppressed.

The control device according to a second aspect of the present invention may perform control so as to increase the torque transfer capacity of the clutch to be equal to or more than a magnitude of the torque output from the internal combustion engine after starting the combustion of the internal combustion engine, after the rotational speed of the internal combustion engine is synchronized with the rotational speed of the rotary electric machine and before the combustion of the internal combustion engine is started.

According to the second aspect, when the combustion of the internal combustion engine starts, the torque transfer capacity of the clutch has already becomes equal to or more than the magnitude of the output torque of the internal combustion engine after the start of the combustion. Therefore, the clutch can be maintained in the engaged state even after the start of the combustion of the internal combustion engine. Consequently, the state can surely be shifted to a state in which the output torque of the internal combustion engine can be transmitted to the wheel side.

The control device according to a third aspect of the present invention may synchronize the rotational speed of the internal combustion engine with the rotational speed of the rotary electric machine while reducing the torque transfer capacity of the clutch, after a difference between the rotational speed of the internal combustion engine and the rotational speed of the rotary electric machine reaches a predetermined value or less.

According to the third aspect, the torque transfer capacity of the clutch can be made small when the rotational speed of the internal combustion engine is synchronized with the rotational speed of the rotary electric machine and the clutch is fully engaged. Furthermore, as described above, the magnitude of the negative output torque is relatively small while the combustion of the internal combustion engine is stopped. Therefore, the stepwise torque difference in the same direction of transmission occurring between before and after the full engagement of the clutch can be suppressed to a small value. As a result, the torque shock occurring between before and after the full engagement of the clutch can be suppressed. On the other hand, when the differential rotational speed between the rotational speed of the internal combustion engine and the rotational speed of the rotary electric machine is large, the torque transfer capacity of the clutch can be increased. Therefore, torque transmitted from the rotary electric machine to the internal combustion engine can be increased. As a result, because the rotational speed of the internal combustion engine can be raised quickly, a period until the full engagement of the clutch can be shortened. Therefore, the state can be shifted early to the state in which the output torque of the internal combustion engine can be transmitted to the wheel side, thereby enabling improvement of a speed of response to an acceleration request by a driver, and so on.

The control device according to a fourth aspect of the present invention may perform control so as to match the torque transfer capacity of the clutch when the rotational speed of the internal combustion engine is synchronized with the rotational speed of the rotary electric machine with driven torque of the internal combustion engine before starting the combustion of the internal combustion engine.

The output torque of the internal combustion engine before starting the combustion is the negative torque, and the internal combustion engine is driven by the torque transmitted from the rotary electric machine side. Consequently, the negative torque output before starting the combustion of the internal combustion engine serves as the driven torque of the internal combustion engine.

According to the fourth aspect, at the time when the clutch is fully engaged, the magnitude of the torque transfer capacity equals to the magnitude of the negative driven torque output from the internal combustion engine at the time of the full engagement of the clutch. Therefore, the stepwise torque difference in the same direction of transmission occurring between before and after the full engagement of the clutch can be eliminated almost completely. As a result, the torque shock occurring between before and after the full engagement of the clutch can be minimized.

DETAILED DESCRIPTION OF THE EMBODIMENTS

1. First Embodiment

Figure 1:
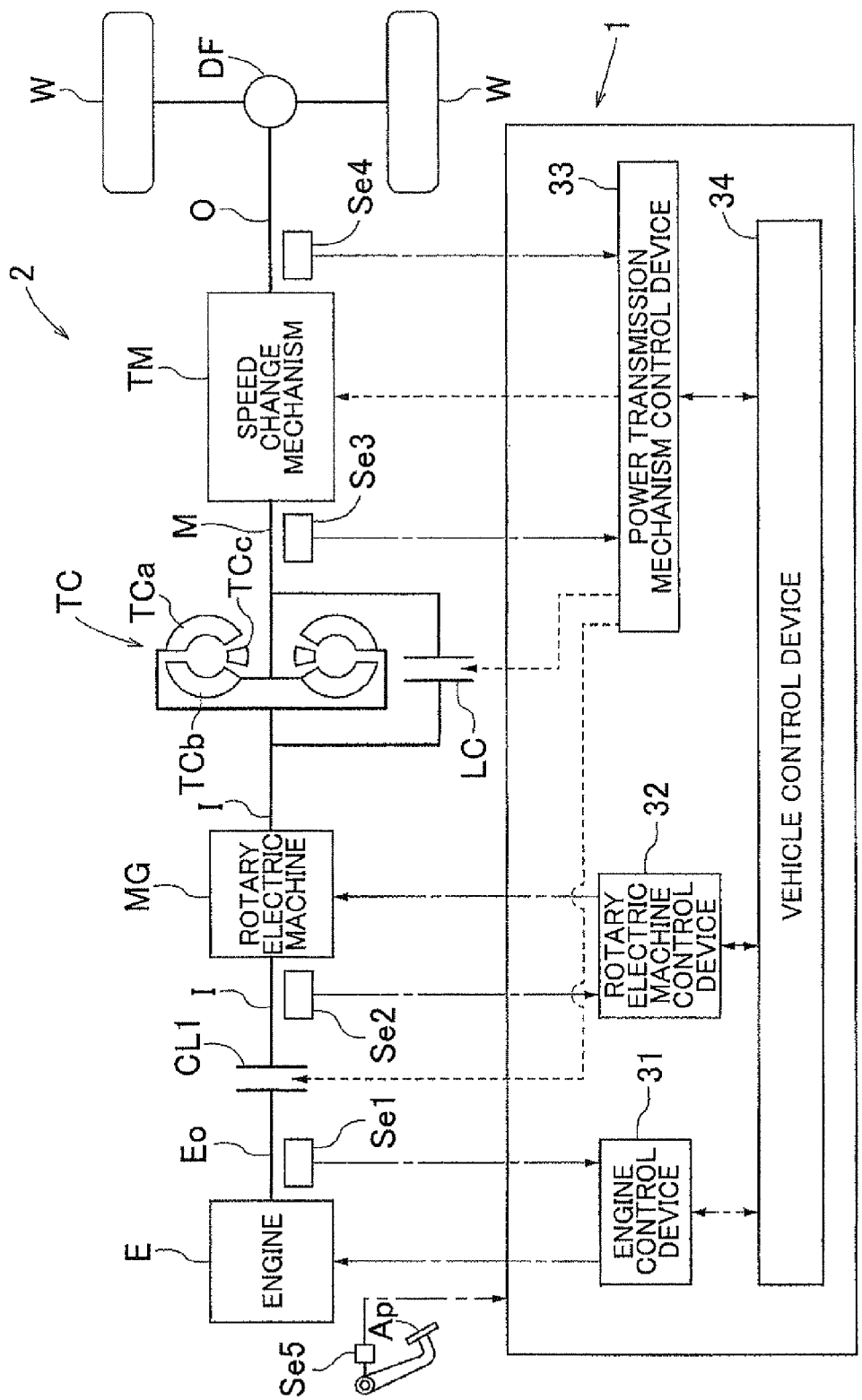
FIG. 1 is a schematic diagram showing a structure of a hybrid vehicle drive apparatus and a control device according to a first embodiment of the present invention.

A first embodiment of a control device 1 according to the present invention will be described based on the accompanying drawings. The control device 1 controls a hybrid vehicle drive apparatus 2 provided with an engine E that is an internal combustion engine, a rotary electric machine MG drivingly connected to wheels W, and a first clutch CL1 drivingly connecting the engine E with the rotary electric machine MG. The hybrid vehicle drive apparatus 2 will be simply called "drive apparatus 2" hereinafter. FIG. 1 is a schematic diagram showing an outline structure of the drive apparatus 2 and the control device 1 according to the present embodiment. In FIG. 1, solid lines represent transmission paths of driving force (torque); dashed lines represent supply paths of hydraulic pressure; and long dashed short dashed lines represent transmission paths of electric signals.

The drive apparatus 2 uses the engine E and the rotary electric machine MG as sources of driving force. Moreover, the drive apparatus 2 is capable of running a vehicle while appropriately switching, by selectively drivingly connecting the first clutch CL1 depending on running conditions, between an electric drive mode of running by using only the rotary electric machine MG as a source of driving force and a parallel mode of running by using at least the engine E as a source of driving force. Note that, in the present application, the term "driving force" is used as a concept including torque.

In the present embodiment, the control device 1 is composed of an engine control device 31, a rotary electric machine control device 32, a power transmission mechanism control device 33, and a vehicle control device 34, and structured to control the engine E composing the drive apparatus 2, the first clutch CL1, the rotary electric machine MG, a lock-up clutch LC of a torque converter TC, and a speed change mechanism TM.

The control device 1 according to the present embodiment is characterized by performing control such that, when a start request of the engine E is issued in the state in which the first clutch CL1 is released and combustion of the engine E is stopped, a rotational speed of the engine E is raised to a rotational speed of the rotary electric machine MG by transmitting driving torque of the rotary electric machine MG to the engine E by increasing a torque transfer capacity of the first clutch CL1, and, after the rotational speed of the engine E is synchronized with the rotational speed of the rotary electric machine MG, the combustion of the engine E is started. Note that the first clutch CL1 is a "clutch" in the present invention. The drive apparatus 2 and the control device 1 according to the present embodiment will be described below in detail.

2. Structure of Hybrid Vehicle Drive Apparatus

The engine E is an internal combustion engine driven by combustion of fuel. Various types of known engines, for example, a spark-ignition engine such as a gasoline engine and a compression-ignition engine such as a diesel engine can be used as the engine E. The description of the present embodiment below will be made of an example of using a gasoline engine as the engine E. The engine E is selectively drivingly connected to the rotary electric machine MG by the first clutch CL1. In the present embodiment, an engine output shaft Eo, such as a crankshaft, of the engine E is selectively drivingly connected to an input shaft I by the first clutch CL1. The input shaft I is, in turn, drivingly connected to a rotor (not shown) of the rotary electric machine MG so as to rotate as a unit therewith. In the present embodiment, the first clutch CL1 is a friction engagement element that is structured so as to be engaged or released by a hydraulic pressure supplied thereto. For example, a wet-type multi-plate clutch or a dry-type clutch is suitably used as such a clutch.

The rotary electric machine MG is structured to have the rotor and a stator, and can serve as a motor (electric motor) producing mechanical power with electric power supply and as a generator (electric generator) producing electric power with power supply. Therefore, the rotary electric machine MG is electrically connected with an electrical storage device (not shown). In the present example, a battery is used as the electrical storage device. A capacitor or the like may also be suitably used as the electrical storage device. The rotary electric machine MG operates in a power running mode with the electric power supply from the battery, or charges the battery by supplying to the battery the electric power generated by a driving force transmitted from the wheels W. The rotor of the rotary electric machine MG rotating as a unit with the input shaft I is drivingly connected to the speed change mechanism TM via the torque converter TC.

The torque converter TC is a device that transmits the torque of the input shaft I transmitted from the rotary electric machine MG or the engine E to an intermediate shaft M via a fluid coupling or the lock-up clutch LC. The torque converter TC is structured to have a pump impeller TCa serving as an input-side rotational member drivingly connected to the input shaft I, a turbine runner TCb serving as an output-side rotational member drivingly connected to the intermediate shaft M, and a stator TCc provided therebetween. Then, the torque converter TC serves as the fluid coupling that transmits torque, via operating oil filled therein, between the pump impeller TCa on the driving side and the turbine runner TCb on the driven side. In this operation, the torque is converted from that of the input-side rotational member to that of the output-side rotational member at a predetermined torque ratio changing depending on a rotational speed ratio between the input and the output members.

The torque converter TC is also provided with the lock-up clutch LC as a friction engagement unit for lock-up. The lock-up clutch LC is a clutch that connects the pump impeller TCa and the turbine runner TCb so as to rotate as a unit with each other in order to eliminate a differential rotation (slip) between the pump impeller TCa and the turbine runner TCb so as to raise a transmission efficiency. In an engaged state of the lock-up clutch LC, because the torque converter TC transmits the driving force of the input shaft I directly to the intermediate shaft M without involving the operating oil, neither torque difference nor rotational speed difference is produced between rotational shafts on the driving side and the driven side. In the present embodiment, the lock-up clutch LC is a friction engagement element that is structured so as to be engaged or released by a hydraulic pressure supplied thereto. For example, a wet-type multi-plate clutch is suitably used as such a friction engagement element.

The speed change mechanism TM is a mechanism that changes a rotational speed of the intermediate shaft M and transmits the changed speed to an output shaft O. In the present embodiment, the speed change mechanism TM is a stepped automatic speed change mechanism having a plurality of shift speeds with different speed ratios. In order to establish the plurality of shift speeds, the speed change mechanism TM is provided with a gear mechanism, such as a planetary gear mechanism, and a plurality of friction engagement elements, such as clutches and brakes, for engaging or releasing rotational elements of the gear mechanism so as to switch among the shift speeds. The speed change mechanism TM changes the rotational speed of the intermediate shaft M and converts the torque thereof at a predetenuined speed ratio set for each of the shift speeds, and then, transmits the changed speed and the converted torque to the output shaft O. The torque transmitted from the speed change mechanism TM to the output shaft O is distributed and transmitted to the two right and left wheels W via a differential device DF. Note that a continuously variable speed change mechanism or other speed change mechanisms may be employed as the speed change mechanism TM.

In the present embodiment, each of the friction engagement elements of the first clutch CL1, the lock-up clutch LC, and the speed change mechanism TM is provided with a return spring, and urged toward the releasing side by a reaction force of the spring. Then, when a force produced by a hydraulic pressure supplied to each of the friction engagement elements exceeds the reaction force of the spring, the friction engagement element changes the state from a released state to an engaged state, and thereby, a torque transfer capacity is produced in the friction engagement element. The torque transfer capacity is the magnitude of maximum torque transmittable by each of the friction engagement elements. The hydraulic pressure at the time when the torque transfer capacity starts to be produced is called a stroke-end pressure. Each of the friction engagement elements is structured so that the torque transfer capacity is increased in proportion to an increase in the supplied hydraulic pressure after exceeding the stroke-end pressure.

3. Structure of Control Device

Figure 2:
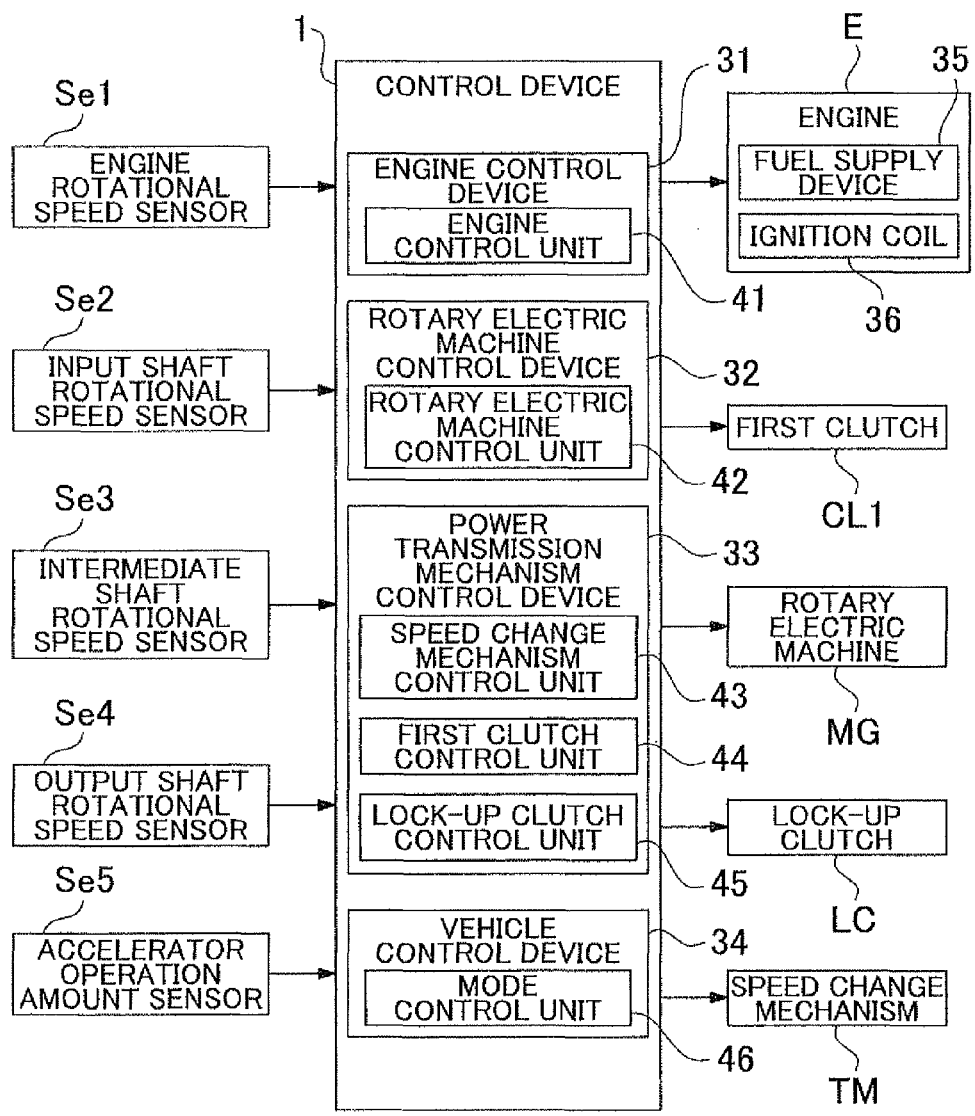
FIG. 2 is a block diagram showing a structure of the control device according to the first embodiment of the present invention.

Next, a structure of the control device 1 controlling the drive apparatus 2 will be described. In the present embodiment, as shown in FIGS. 1 and 2, the control device 1 is composed of the engine control device 31 controlling the engine E, the rotary electric machine control device 32 controlling the rotary electric machine MG, the power transmission mechanism control device 33 controlling the friction engagement elements of the speed change mechanism TM, the first clutch CL1, and so on, and the vehicle control device 34 controlling the drive apparatus 2 by integrating these control devices.

Each of the control devices 31 to 34 is provided with an arithmetic processing unit, such as a CPU, as a core member, and structured to have storage units such as a RAM (random access memory) structured so as to be able to read/write data from/to the arithmetic processing unit, a ROM (read-only memory) structured so as to be able to read data from the arithmetic processing unit, and so on. Functional units 41 to 46 of the control devices 31 to 34 are structured by software (programs) stored in the ROMs, etc. of the control devices, or hardware such as separately provided arithmetic circuits, or the both. The control devices 31 to 34 are structured so as to communicate with each other. Thus, the control devices 31 to 34 share variety of information such as detection information of sensors and control parameters, and perform cooperative control, thereby achieving functions of the functional units 41 to 46.

The drive apparatus 2 is provided with sensors Se1 to Se5 as mentioned above. Electric signals produced from the sensors are input to the control device 1. The control device 1 calculates the detection information of the sensors based on the electric signals thus input.

An engine rotational speed sensor Se1 is a sensor that detects the rotational speed of the engine output shaft Eo (engine E). The control device 1 calculates the rotational speed of the engine E from the input signal from the engine rotational speed sensor Se1. An input shaft rotational speed sensor Se2 is a sensor that detects a rotational speed of the input shaft I, Because the rotor of the rotary electric machine MG is drivingly connected to the input shaft I in an integrated manner, the control device 1 calculates the rotational speeds of the input shaft I and the rotary electric machine MG from the input signal from the input shaft rotational speed sensor Se2. An intermediate shaft rotational speed sensor Se3 is a sensor that detects the rotational speed of the intermediate shaft M. The control device 1 calculates a rotational speed on the output side of the torque converter TC and a rotational speed on the input side of the speed change mechanism TM from the input signal from the intermediate shaft rotational speed sensor Se3. An output shaft rotational speed sensor Se4 is a sensor that detects a rotational speed of the output shaft O. The control device 1 calculates the rotational speed on the output side of the speed change mechanism TM from the input signal from the output shaft rotational speed sensor Se4.

The control device 1 calculates also a vehicle speed based on the input signal from the output shaft rotational speed sensor Se4 because the rotational speed of the output shaft O is proportional to the vehicle speed.

An accelerator operation amount sensor Se5 is a sensor that detects an accelerator operation amount by detecting an operation amount of an accelerator pedal Ap operated by a driver, as shown in FIG. 1. The control device 1 calculates the accelerator operation amount based on the input signal from the accelerator operation amount sensor Se5.

3-1. Structure of Engine Control Device

The engine control device 31 is a control device that controls the engine E. The detection information of various sensors such as the engine rotational speed sensor Se1 is transmitted to the engine control device 31. The engine control device 31, in turn, generates output electric signals to control a fuel supply device 35 supplying fuel to a combustion chamber of the engine E, an ignition coil 36 for firing a spark plug arranged in the combustion chamber, a throttle valve adjusting an intake air volume that is an amount of air drawn into the combustion chamber, actuators adjusting open/close timing and lift amounts of intake and exhaust valves in the combustion chamber, and so on.

The engine control device 31 is provided with an engine control unit 41. The engine control unit 41 is a functional unit that controls the engine E. The engine control unit 41 controls the engine E based on required engine torque Te commanded by a mode control unit 46 provided in the vehicle control device 34 to be described later, so that output torque of the engine E matches with the required engine torque Te. That is, the required engine torque Te is a target value of the output torque that is torque transmitted from the engine E to the engine output shaft Eo. Actual output torque of the engine E is torque obtained by subtracting the magnitude of negative torque produced by friction, pumping, and so on from positive torque produced by combustion, and changes in a complicated manner due to various factors. The positive torque is roughly proportional to an amount of fuel burnt per combustion stroke, and increases or decreases depending on ignition timing and so on. On the other hand, the magnitude of the negative torque is proportional to the rotational speed of the engine E, the magnitude of negative pressure in an intake pipe, and so on. The magnitude of the negative torque produced by the pumping is proportional to the magnitude of the negative pressure in the intake pipe. The magnitude of the negative pressure in the intake pipe is, in turn, proportional to the rotational speed of the engine E, and inversely proportional to an opening of the throttle valve. Note that, when the combustion of the engine E is stopped, the output torque of the engine E is the negative torque due to, for example, the friction and the pumping.

In the present embodiment, the engine control unit 41 adjusts, based on the required engine torque Te, an amount of fuel supply, the ignition timing, and the negative pressure in the intake pipe by controlling the fuel supply device 35, the ignition coil 36, the throttle valve, the actuators, and so on, so as to match the actual output torque of the engine E with the required engine torque Te.

In the present embodiment, the engine control unit 41 performs a process to estimate the actual engine output torque by calculating the positive torque and the negative torque produced in the engine E, based on the amount of fuel actually supplied to the engine E, or on the ignition timing, the rotational speed of the engine E, the negative pressure in the intake pipe, and so on. Then, the engine control unit 41 performs a process to transmit the estimated value of the actual engine output torque to other control devices such as the vehicle control device 34. Alternatively, the engine control unit 41 may perform the process to estimate the actual output torque of the engine E through a process of setting the actual output torque of the engine E to a value obtained by applying response delay processing to a change in the required engine torque Te. In this case, the magnitude of the response delay may be set to a value such as the magnitude of response delay in the intake air volume caused by the intake pipe. The process to estimate the actual engine output torque may alternatively be performed by the mode control unit 46 provided in the vehicle control device 34.

When the mode control unit 46 of the vehicle control device 34 commands a stop of the combustion, the engine control unit 41 stops the combustion of the engine E by cutting off the fuel supply from the fuel supply device 35 to the combustion chamber. On the other hand, when the mode control unit 46 of the vehicle control device 34 commands a start of the combustion, the engine control unit 41 starts the combustion of the engine E by starting the fuel supply from the fuel supply device 35 to the combustion chamber. When starting the combustion, the engine control unit 41 supplies the fuel according to a fuel supply sequence for engine start. The engine control unit 41 may stop or start the combustion by stopping or starting the ignition achieved by energizing the ignition coil 36, in the case of a spark-ignition engine such as a gasoline engine. The engine control unit 41 may also determine whether to stop or start the combustion based on the required engine torque Te commanded by the mode control unit 46, so as to stop or start the combustion by the fuel supply device 35 or the ignition coil 36.

3-2. Structure of Rotary Electric Machine Control Device

The rotary electric machine control device 32 is a control device that controls the rotary electric machine MG. The detection information of sensors such as the input shaft rotational speed sensor Se2 is input to the rotary electric machine control device 32. The rotary electric machine control device 32 is provided with an inverter that supplies the electric power from the battery to the rotary electric machine MG to produce the positive torque, or causes the rotary electric machine MG to produce the negative torque so as to supply the electric power to the battery.

The rotary electric machine control device 32 is provided with a rotary electric machine control unit 42. The rotary electric machine control unit 42 is a functional unit that controls the rotary electric machine MG. The rotary electric machine control unit 42 controls the rotary electric machine MG via the inverter, based on required motor torque Tm commanded by the mode control unit 46 of the vehicle control device 34, so that the output torque that is torque transmitted from the rotary electric machine MG to the input shaft I matches with the required motor torque Tm. The output torque of the rotary electric machine MG is controlled at a relatively high accuracy because the output torque is proportional to a current supplied. Furthermore, a delay from a change in the required motor torque Tm to a change in the output torque is relatively small. The rotary electric machine control unit 42 also controls, when the mode control unit 46 commands a required motor rotational speed, the rotary electric machine MG via the inverter, based on the required motor rotational speed, so that the rotational speed of the rotary electric machine MG matches with the required motor rotational speed.

3-3. Structure of Power Transmission Mechanism Control Device

The power transmission mechanism control device 33 is a control device that controls the speed change mechanism TM, the first clutch CL1, and the lock-up clutch LC. The detection information of sensors such as the intermediate shaft rotational speed sensor Se3 and the output shaft rotational speed sensor Se4 is input to the power transmission mechanism control device 33. The power transmission mechanism control device 33 is provided with a hydraulic control device supplying a hydraulic pressure at a commanded level to each of the friction engagement elements. The power transmission mechanism control device 33 is also provided with a speed change mechanism control unit 43, a first clutch control unit 44, and a lock-up clutch control unit 45.

3-3-1. Speed Change Mechanism Control Unit

The speed change mechanism control unit 43 is a functional unit that controls the speed change mechanism TM. The speed change mechanism control unit 43 determines a target shift speed in the speed change mechanism TM, based on the sensor detection information such as the vehicle speed, the accelerator operation amount, and a shift position. Then, the speed change mechanism control unit 43 establishes the shift speed provided as a target for the speed change mechanism TM by engaging or releasing the friction engagement elements provided in the speed change mechanism TM by controlling the hydraulic pressure supplied to each of the friction engagement elements via the hydraulic control device.

3-3-2. First Clutch Control Unit

The first clutch control unit 44 is a functional unit that controls the first clutch CL1. The first clutch control unit 44 controls that first clutch CL1 by controlling the hydraulic pressure supplied to the first clutch CL1 via the hydraulic control device.

In the present embodiment, the first clutch control unit 44 controls the hydraulic pressure supplied to the first clutch CL1 via the hydraulic control device, based on a required torque transfer capacity Tk commanded by the mode control unit 46 provided in the vehicle control device 34, so that an actual torque transfer capacity of the first clutch CL1 matches with the required torque transfer capacity Tk. For example, the first clutch control unit 44 sets a target hydraulic pressure based on a torque capacity characteristics map storing relational characteristics between the hydraulic pressure and the torque transfer capacity, and on the required torque transfer capacity Tk. Then, the first clutch control unit 44 issues a command of the target hydraulic pressure to the hydraulic control device, which, in turn, supplies a hydraulic pressure equivalent to the target hydraulic pressure to the first clutch CL1. Note that the torque capacity characteristics map may be provided so as to store the relational characteristics between the hydraulic pressure and the torque transfer capacity Tk depending on a rotational speed difference between the input and the output members.

The first clutch control unit 44 performs a process to estimate an actual torque transfer capacity Tke of the first clutch CL1 based on the required torque transfer capacity Tk commanded. Then, the first clutch control unit 44 performs a process to transmit the torque transfer capacity Tke thus estimated to the other control devices 31 to 34 such as the vehicle control device 34. More specifically, the first clutch control unit 44 performs a process to estimate the actual hydraulic pressure supplied to the first clutch CL1 based on the target hydraulic pressure commanded to the hydraulic control device. Then, the first clutch control unit 44 estimates the actual torque transfer capacity Tke of the first clutch CL1 based on the estimated value of the hydraulic pressure, the torque capacity characteristics map, and so on. The estimation process of the actual hydraulic pressure can be achieved, for example, by a process in which a value obtained by applying response delay processing to a change in the target hydraulic pressure is assumed to be the actual hydraulic pressure. The magnitude of the response delay may be changed depending on the estimated value of the hydraulic pressure. For example, until the hydraulic pressure reaches the stroke-end pressure, the magnitude of the response delay is set to a large value because the operating oil supplied to the friction engagement element is used for filling a hydraulic cylinder provided in the friction engagement element, and thereby, the hydraulic pressure rises at a slow speed. After the hydraulic pressure exceeds the stroke-end pressure, the magnitude of the response delay is set to a small value because the operating oil supplied to the friction engagement element is no longer used for filling the hydraulic cylinder, and thereby, the hydraulic pressure rises at a high speed. When using a first-order lag as the response delay, the magnitude of the response delay has a value of a time constant.

Alternatively, the first clutch control unit 44 may perform the process to estimate the actual torque transfer capacity Tke through a process of setting the actual torque transfer capacity Tke to a value obtained by applying response delay processing to a change in the required torque transfer capacity Tk. In this case, dead time delay processing is used as the response delay processing after the required torque transfer capacity Tk is increased from zero. That is, until a predetermined dead time passes after the required torque transfer capacity Tk is increased from zero, the torque transfer capacity Tke is set to be maintained at zero. The reason for this is such that: because the torque transfer capacity is produced when the hydraulic pressure supplied to the friction engagement element is higher than the stroke-end pressure, the predetermined dead time is produced after the required torque transfer capacity Tk is increased from zero until the hydraulic pressure reaches the stroke-end pressure at which the torque transfer capacity starts to increase. Then, after the predetermined dead time, the response delay processing is performed by using a process such as the first-order lag. The magnitude of this response delay is set to the magnitude of a response delay from the above-mentioned change in the target hydraulic pressure to a change in the actual hydraulic pressure.

The first clutch CL1 may be structured to have a hydraulic pressure sensor, and the first clutch control unit 44 may perforin the process to estimate the actual torque transfer capacity Tke based on a hydraulic pressure detected by the hydraulic pressure sensor instead of the estimated value of the hydraulic pressure described above. The process to estimate the actual torque transfer capacity Tke may alternatively be performed in the vehicle control device 34.

3-3-3. Lock-up Clutch Control Unit

The lock-up clutch control unit 45 is a functional unit that controls the lock-up clutch LC. The lock-up clutch control unit 45 determines a target state of whether to engage or to release the lock-up clutch LC, based on the sensor detection information such as the vehicle speed, the accelerator operation amount, and a shift position. Then, depending on the target state thus determined, the speed change mechanism control unit 43 engages or releases the lock-up clutch LC by controlling the hydraulic pressure supplied to the lock-up clutch LC via the hydraulic control device.

3-4. Structure of Vehicle Control Device

The vehicle control device 34 is a control device that performs control so as to integrate, as overall vehicle control, various types of control such as various torque control operations applied to the first clutch CL1, the engine E, the rotary electric machine MG, and so on. The vehicle control device 34 is provided with the mode control unit 46.

The mode control unit 46 is a functional unit that calculates a target driving force of the drive apparatus 2 and determines an operation mode of sources of driving force that are the engine E and the rotary electric machine MG, depending on the accelerator operation amount, the vehicle speed, and so on, then calculates required torque for the sources of driving force and transfer torque capacities of clutches, and then performs the integrated control by issuing the results thus obtained as commands to other functional units. Then, the mode control unit 46 performs engine start control during running such that, when a start request of the engine E is issued in the state in which the first clutch CL1 is released and combustion of the engine E is stopped, the rotational speed of the engine E is raised to the rotational speed of the rotary electric machine MG by transmitting the driving torque of the rotary electric machine MG to the engine E by increasing the torque transfer capacity of the first clutch CL1, and, after the rotational speed of the engine E is synchronized with the rotational speed of the rotary electric machine MG, the combustion of the engine E is started.

3-4-1. Calculation of Required Input Shaft Torque

The mode control unit 46 calculates required input shaft torque Ti. In the present embodiment, the required input shaft torque Ti serves as a target value of the torque transmitted from the input shaft I connected with the sources of driving force to the torque converter TC. For that purpose, the mode control unit 46 first calculates the target driving force of the drive apparatus 2 to be output from the wheels W, based on the accelerator operation amount, the vehicle speed, and so on. Next, the mode control unit 46 calculates, from the target driving force of the drive apparatus 2, required output shaft torque serving as a target value of the torque transmitted from the output shaft O to the wheels W. Then, the mode control unit 46 calculates, from the required output shaft torque, the required input shaft torque Ti, based on the speed ratio of the shift speed established in the speed change mechanism TM, and, also based on torque transmission characteristics of the torque converter TC, for example, if the lock-up clutch LC is in the released state.

3-4-2. Calculation of Operation Modes

The mode control unit 46 calculates the operation modes of the sources of driving force based on the accelerator operation amount, the vehicle speed, a battery charge level, and so on. The battery charge level is detected by a battery condition detecting sensor. In the present embodiment, the electric drive mode of running by using only the rotary electric machine MG as a source of driving force and the parallel mode of running by using at least the engine E as a source of driving force are provided as the operation modes. When the operation mode is changed from the electric drive mode to the parallel mode, a parallel transition mode is temporarily established as an operation mode in which control is performed to shift the mode from the electric drive mode to the parallel mode. When the operation mode is changed from the parallel mode to the electric drive mode, an electric drive transition mode is temporarily established as an operation mode in which control is performed to shift the mode from the parallel mode to the electric drive mode.

In the present embodiment, description will be made of an example in which the electric drive mode is obtained as the calculated operation mode in the case of a small accelerator operation amount and a high battery charge level whereas the parallel mode is obtained as the calculated operation mode in the case of a large accelerator operation amount or a low battery charge level. When the vehicle speed is zero and no acceleration request is issued from the driver such as in the case of a minimum accelerator operation amount, the vehicle is assumed to be in a stopped state, and the operation mode is set to a mode for the stopped state. Then, the mode control unit 46 performs control according to a control sequence for the stopped state.

3-4-3. Calculation of Required Torque

The mode control unit 46 calculates, depending on each of the operation modes, the required engine torque Te serving as the target value of the output torque of the engine E, the required torque transfer capacity Tk serving as the target value of the torque transfer capacity of the first clutch CL1, and the required motor torque Tm serving as the target value of the output torque of the rotary electric machine MG. The mode control unit 46 also sets a target combustion state of the engine E, depending on each of the operation modes. An outline of the operation modes will be described below.

3-4-3-1. Electric Drive Mode

If the operation mode is determined to be the electric drive mode, the required engine torque Te and the required torque transfer capacity Tk are set to zero, and the required motor torque Tm is set to a value equal to the required input shaft torque Ti. The mode control unit 46 also sets the target combustion state of the engine E to a non-combusting state that is the state in which the combustion is stopped.

3-4-3-2. Parallel Mode

If the operation mode is determined to be the parallel mode, the mode control unit 46 sets the required torque transfer capacity Tk to a torque transfer capacity for achieving a fully engaged state of the first clutch CL1, and sets the required engine torque Te and the required motor torque Tm so as to make the sum of the required engine torque Te and the required motor torque Tm equal to the required input shaft torque Ti. The fully engaged state is an engagement state in which a rotational speed difference (slip) does not exist between the input and the output members of a friction engagement element. The mode control unit 46 also sets the target combustion state of the engine E to a combusting state.

3-4-3-3. Parallel Transition Mode

When calculation is performed to set the operation mode to be the parallel transition mode, the mode control unit 46, after fully engaging the first clutch CL1 by increasing the required torque transfer capacity Tk of the first clutch CL1 from zero, sets the target combustion state of the engine E to a combustion starting state for shifting the state from the non-combusting state to the combusting state, and then, starts the combustion of the engine E while increasing the required engine torque Te. The mode control unit 46 sets the required motor torque Tm so as to make the sum of the required motor torque Tm and the torque transfer capacity of the first clutch CL1 equal to the required input shaft torque Ti before the first clutch is fully engaged, and sets the required motor torque Tm so as to match the sum of the required motor torque Tm and the engine output torque with the required input shaft torque Ti after the first clutch is fully engaged. Note that the estimated values described above are used as the output torque of the engine E and the torque transfer capacity of the first clutch CL1. The parallel transition mode is a characteristic operation mode according to the present invention, and will be described later in detail.

3-4-3-4. Electric Drive Transition Mode

When the operation mode is determined to be the electric drive transition mode for shifting the mode from the parallel mode to the electric drive mode, the mode control unit 46, after reducing the required torque transfer capacity Tk of the first clutch CL1 to zero, sets the target combustion state of the engine E to a combustion stopping state for shifting the state from the combusting state to the non-combusting state, and then, stops the combustion of the engine E while setting the required engine torque Te to zero. The mode control unit 46 also sets the required motor torque Tm so as to match the sum of the required motor torque Tm and the torque transfer capacity of the first clutch CL1 with the required input shaft torque Ti before the first clutch is fully released, and sets the required motor torque Tm so as to have a value equal to the required input shaft torque Ti after the first clutch is fully released.

3-4-4. Control in Parallel Transition Mode

In the embodiment below, control of the mode control unit 46 in the parallel transition mode will be described with reference to FIGS. 3 to 7. Specifically, the description will be made of an example in which the parallel transition mode is obtained as the calculated operation mode (at time t11 in FIG. 3), for example, due to an increase in the accelerator operation amount, in the state in which the vehicle is running with a small accelerator operation amount and the operation mode is set to the electric drive mode (until time t11 in FIG. 3). In the present example, the first clutch CL1 is released and the combustion of engine E is stopped in the electric drive mode. Furthermore, in the present example, the rotary electric machine MG is drivingly connected to the wheels W via the torque converter TC and the speed change mechanism TM, and rotates. In this case, a certain shift speed is established in the speed change mechanism TM, and the lock-up clutch LC is placed in the fully engaged state. The rotary electric machine MG is rotating because the vehicle is running. Note that the rotary electric machine MG may be in the state of not completely drivingly connected to the wheels W, for example, in the state in which the shift speed is not completely established in the speed change mechanism TM that is in the process of shifting, or in the state in which the lock-up clutch LC is slipping. Even in such a state, the rotational speed of the engine E is raised by a rotational driving force of the rotary electric machine MG.

If the operation mode is set to the electric drive mode, the mode control unit 46 sets the target combustion state of the engine E to the non-combusting state, the required torque transfer capacity Tk to zero, and the required motor torque Tm to a value equal to the required input shaft torque Ti, as described above. In the present example, the required engine torque Te is set to zero. Then, the mode control unit 46 issues the required torque and the target combustion state thus set as commands to the control devices 31 to 33. The control devices 31 to 33, in turn, control the engine E, the rotary electric machine MG, and the first clutch CL1.

3-4-4-1. Rise of Engine Rotation Speed

When it is determined that the operation mode is shifted from the electric drive mode to the parallel mode, that is, when the operation mode is changed to the parallel transition mode (at time t11 in FIG. 3), the mode control unit 46 performs control so as to increase the torque transfer capacity of the first clutch CL1 and thereby raise the rotational speed of the engine E to the rotational speed of the rotary electric machine MG. Note that the case where the operation mode is shifted from the electric drive mode to the parallel mode corresponds to the "case in which a start request of the internal combustion engine is issued" in the present invention.

In the present embodiment, when the operation mode is determined to be the parallel transition mode, the mode control unit 46 increases the required torque transfer capacity Tk from zero to a first target value Tk1. The mode control unit 46 issues a command of the required torque transfer capacity Tk (=Tk1) thus set to the speed change mechanism control unit 43 so as to increase the torque transfer capacity of the first clutch CL1 to the command value. As described above, the actual torque transfer capacity changes in response to the change in the command value with a tracking delay. Thus, after the predetermined dead time (at time t12 in FIG. 12), the torque transfer capacity gradually increases to the command value with a predetermined delay.

When the torque transfer capacity of the first clutch CL1 becomes larger than zero, the first clutch CL1 is placed in the engaged state. Before the operation mode is changed to the parallel transition mode, the rotary electric machine MG is rotating, and the rotation of the engine E is stopped. Therefore, a differential rotational speed exists between the input and the output members of the first clutch CL1. When the differential rotational speed exists, torque of the torque transfer capacity is transmitted from the member of a higher rotational speed to the member of a lower rotational speed. Because the rotational speed of the engine output shaft Eo is lower than that of the input shaft I immediately after the transition to the parallel transition mode, the torque is transmitted from the input shaft I to the engine output shaft Eo, that is, from the rotary electric machine MG to the engine E. Therefore, the torque equivalent to the torque transfer capacity of the first clutch CL1 is transmitted to the engine E. Then, the rotational speed of the engine E rises at a predetermined acceleration. The predetermined acceleration is a value obtained by dividing the total torque of the torque transfer capacity and the output torque of the engine E by a moment of inertia of the engine E and so on. The required torque transfer capacity Tk is set to the predetermined constant value Tk1 during a predetermined period after the change to the parallel transition mode, and the output torque of the engine E in the non-combusting state is negative torque of a relatively low level produced by friction, pumping, and so on. Therefore, the rotational speed of the engine E rises at an approximately constant acceleration.

3-4-4-2. Synchronization of Rotational Speed of Engine with Rotational Speed of Rotary Electric Machine After a differential rotational speed $\Delta W$ that is the difference between the rotational speed of the engine E and the rotational speed of the rotary electric machine MG reaches a predetermined value $\Delta W1$ or less, the mode control unit 46 performs control so as to synchronize the rotational speed of the engine E with the rotational speed of the rotary electric machine while reducing the torque transfer capacity of the first clutch CL1.

In this operation, in the present embodiment, the mode control unit 46 performs control so that the torque transfer capacity of the first clutch CL1, when the rotational speed of the engine E is synchronized with the rotational speed of the rotary electric machine MG, matches with the magnitude of the output torque of the engine E before starting combustion. The output torque of the engine E before starting combustion is negative torque, and the engine E is driven by the torque transmitted from the rotary electric machine side via the first clutch CL1. The output torque of the engine E before starting combustion such as described above corresponds to "driven torque" in the present invention.

Specifically, after the rotational speed of the engine E increases so that the differential rotational speed $\Delta W$ between the engine E and the rotary electric machine MG reaches the predetermined first determination value $\Delta W1$ or less (at time t13 in FIG. 3), the mode control unit 46 reduces the required torque transfer capacity Tk to a second target value Tko in accordance with reduction in the differential rotational speed $\Delta W$ between the engine E and the rotary electric machine MG. Note that, as will be described later, the second target value Tko is set so as to match with the magnitude of the output torque Teo of the engine E.

In the present embodiment, the mode control unit 46 sets the required torque transfer capacity Tk by using PI control in response to the differential rotational speed $\Delta W$ between the engine E and the rotary electric machine MG. In the present example, the mode control unit 46 sets the required torque transfer capacity Tk according to the following formula (1).

$$Tk = Kp \times \Delta W + \int(Ki \times \Delta W)dt + Tko \quad (1)$$

In the right-hand member, the first term is a proportional term; the second term is an integral term; and the third term is an offset term. The variable $\Delta W$ is the differential rotational speed obtained by subtracting the rotational speed of the engine E from the rotational speed of the rotary electric machine MG. The coefficient Kp is a proportional gain, and Ki is an integral gain. The term Tko is the offset that is set so as to match with the output torque Teo of the engine E. The term Tko may be set to a predetermined fixed value, or to the magnitude of the output torque of the engine E estimated by the engine control unit 41. The engine control unit 41 estimates the output torque, for example, to be negative torque that is calculated based on a map in which negative torque produced by the engine E corresponding to the rotational speed and a throttle opening of the engine E is set in advance, and also based on detected values of the rotational speed and the throttle opening of the engine E. Alternatively, the third term in the right-hand member of the formula (1) may be eliminated so that Tko is used as an initial value of the integral term. In the present example, the proportional gain Kp is set so that a calculation value of the formula (1) at a start of the PI control (at time t13 in FIG. 3) matches with the predetermined first target value Tk1 set before the start of the PI control. Moreover, the proportional gain Kp and the integral gain Ki may be structured to be variable gains that are set depending on the differential rotational speed $\Delta W$. For example, the proportional gain Kp and the integral gain Ki may be set depending on the magnitude of the differential rotational speed $\Delta W$. In this case, the magnitude of the proportional gain Kp and the integral gain Ki may be set to decrease as the magnitude of the differential rotational speed $\Delta W$ becomes smaller. Furthermore, instead of the proportional value of $Kp \times \Delta W$ and the integral value of $Ki \times \Delta W$ in the formula (1), the proportional value and the integral value may be calculated based on the differential rotational speed $\Delta W$ and a map, which is provided with the proportional value and the integral value set corresponding to the differential rotational speed $\Delta W$.

The proportional gain Kp and the integral gain Ki are set so that the rotational speed of the engine E does not overshoot the rotational speed of the rotary electric machine MG. By setting the gains in such a manner, a changing speed (acceleration) of the differential rotational speed $\Delta W$ can be made close to zero when the rotational speed of the engine E first matches with the rotational speed of the rotary electric machine MG. In the present embodiment, the rotary electric machine MG has a large moment of inertia because of being drivingly connected to the wheels W. Therefore, an acceleration of the rotational speed of the rotary electric machine MG is small. Consequently, the acceleration of the differential rotational speed $\Delta W$ almost equals to an acceleration of the engine E. As described above, the acceleration of the rising rotational speed of the engine E is proportional to the torque obtained by summing the torque transfer capacity of the first clutch CL1 and the output torque of the engine E. Accordingly, when the acceleration of the differential rotational speed $\Delta W$ comes close to zero, the torque transfer capacity of the first clutch CL1 comes close to the magnitude of the output torque of the engine E. Consequently, also by setting the PI gains so as to prevent the overshoot, the torque transfer capacity when the rotational speed of the engine E matches with the rotational speed of the rotary electric machine MG can automatically be made close to the magnitude of the output torque of the engine E.

Figure 3:
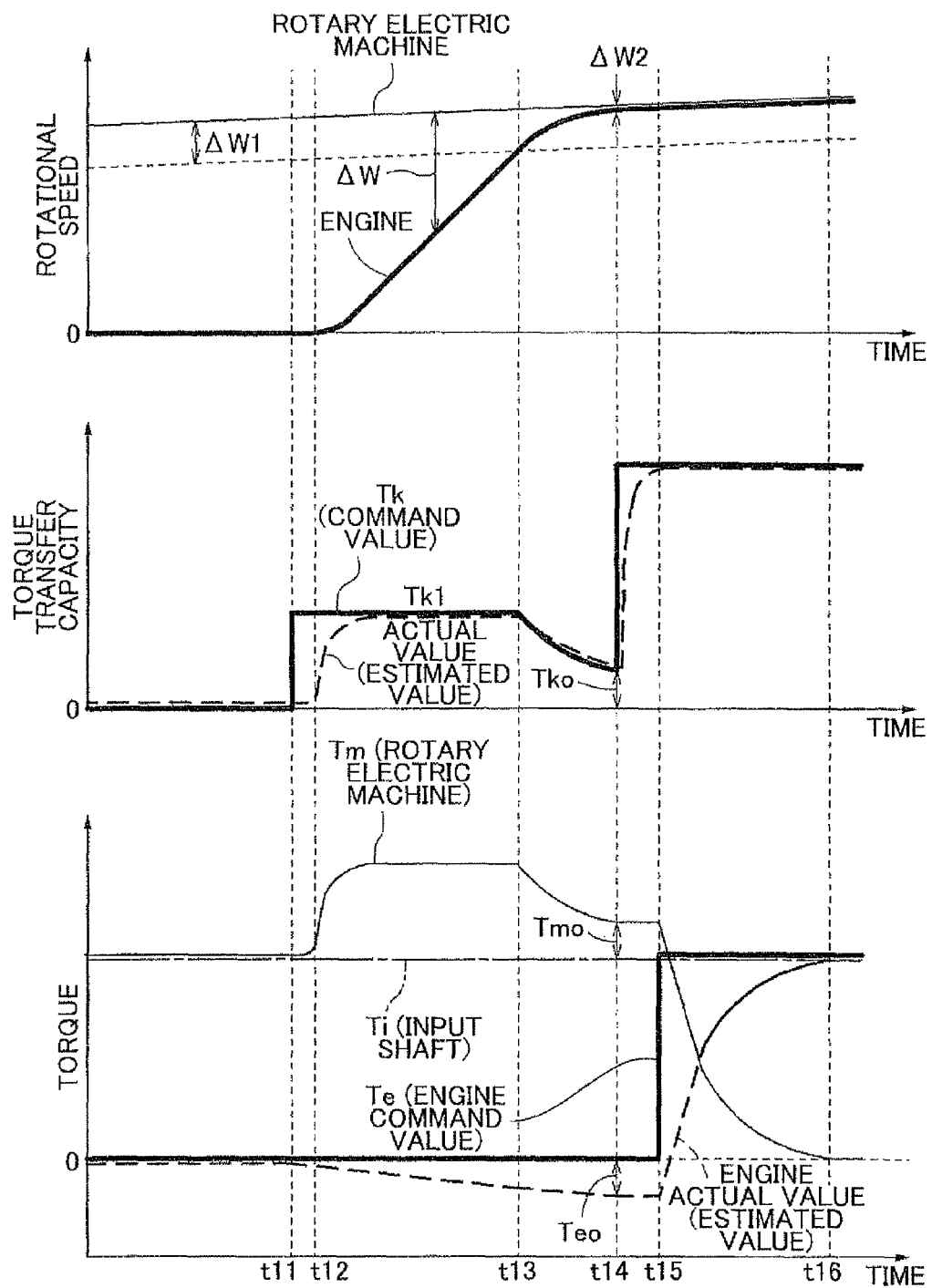
FIG. 3 is a timing chart showing a process of the control device according to the first embodiment of the present invention.

The mode control unit 46 may alternatively start the PI control after the mode is changed to the parallel transition mode (at time t11 in FIG. 3). In this case, the mode control unit 46 performs a process to limit the calculation value of the formula (1) with the first target value Tk1 serving as an upper limit. The mode control unit 46 may be structured to stop update of the integral value in the second term of the formula (1) and to perform anti-windup processing of the integral value. The behavior of the required torque transfer capacity Tk as shown in FIG. 3 can be achieved also in this manner.

Figure 4A:
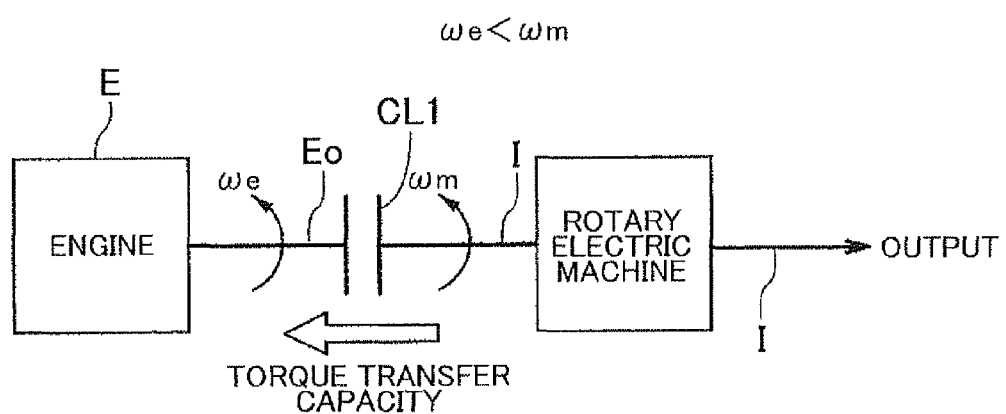
FIGS. 4A and 4B are diagrams explaining torque transmission of a first clutch according to the first embodiment of the present invention.
Figure 4B:
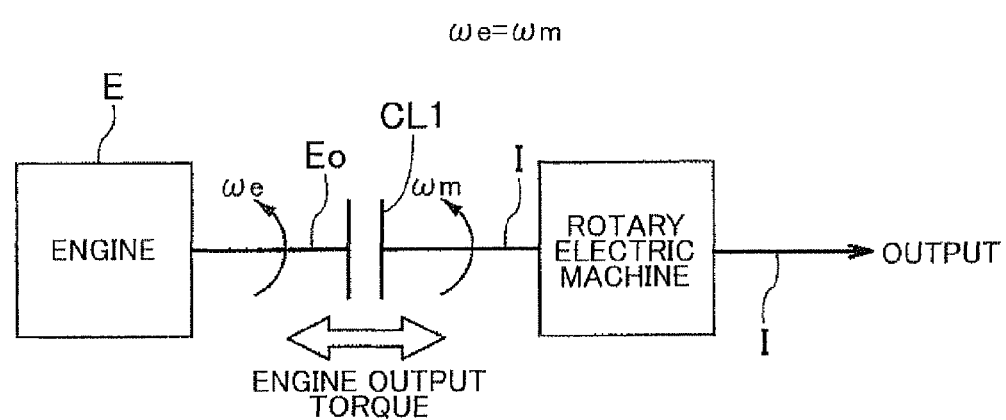

Description will now be made, with reference to FIGS. 4A and 4B, of operations and effects achieved by matching the second target value Tko, that is the torque transfer capacity when the rotational speed of the engine E is synchronized with the rotational speed of the rotary electric machine MG with the magnitude of the output torque Teo of the engine E. As described above, while the rotational speed of the engine E is lower than the rotational speed of the rotary electric machine MG and thereby the differential rotational speed exists between the input and the output members of the friction engagement element, the torque transmitted by the first clutch CL1 has the same magnitude as the torque transfer capacity of the first clutch CL1 (FIG. 4A). On the other hand, if the differential rotational speed of the first clutch CL1 disappears, the torque transmitted by the first clutch CL1 has the same magnitude as the output torque of the engine E (FIG. 4B). Consequently, if there is a difference between the torque transfer capacity and the output torque of the engine E before and after the differential rotational speed of the first clutch CL1 disappears, the magnitude of torque transmitted via the friction engagement element changes, possibly resulting in torque shock. Therefore, as in the present embodiment, the torque is controlled so as to have the same magnitude between the torque transfer capacity before the differential rotational speed of the first clutch CL1 disappears and the output torque of the engine E after the differential rotational speed of the first clutch CL1 disappears, whereby the torque shock at the switching can be suppressed. In the present embodiment, the control is performed so as to match the second target value Tko, which is the torque transfer capacity at the time when the differential rotational speed disappears, with the magnitude of the output torque Teo of the engine E at that time. In the present embodiment, the combustion of the engine E is not started until the differential rotational speed of the first clutch CL1 disappears. Consequently, even after the differential rotational speed of the first clutch CL1 disappears, the output torque Teo of the engine E is negative torque, and thus, the torque is transmitted in the direction from the rotary electric machine MG side to the engine E side. Therefore, the direction of transmission is the same before and after the differential rotational speed of the first clutch CL1 disappears. Thus, according to the present embodiment, the torque shock can be prevented from occurring when the differential rotational speed disappears and the synchronization is achieved.

Until the differential rotational speed ΔW reaches the predetermined value ΔW1 or less, the mode control unit 46 sets the torque transfer capacity of the first clutch CL1 to a value larger than the second target value Tko so as to quicken the rise of the rotational speed of the engine E. After the differential rotational speed ΔW reaches the predetermined value ΔW1 or less, the mode control unit 46 reduces the torque transfer capacity of the first clutch CL1 to the second target value Tko. Therefore, the torque shock can be suppressed from occurring when the differential rotational speed ΔW disappears. Consequently, according to the present embodiment, the transition to the parallel mode can be shortened in time, while suppressing the torque shock from occurring at the time of the transition.

Next, description will be made of setting of the required motor torque Tm of the rotary electric machine MG after the mode is changed to the parallel transition mode until the rotational speeds are synchronized (from time t11 to time t14 in FIG. 3). In the engagement state of the first clutch CL1 in which the differential rotational speed exists, the torque equal to the torque transfer capacity of the first clutch CL1 is transmitted from the rotary electric machine MG to the engine E. Consequently, the torque transmitted from the rotary electric machine MG to the wheels W side is reduced by an amount of the torque transfer capacity of the first clutch CL1. Therefore, the mode control unit 46 sets the required motor torque Tm to a value obtained by increasing the required input shaft torque Ti by the amount of the torque transfer capacity of the first clutch CL1, so that the torque transmitted from the rotary electric machine MG to the wheels W side is maintained at the required input shaft torque Ti. The required torque transfer capacity Tk may be used as this torque transfer capacity. However, the response delay of the change in the actual torque transfer capacity relative to the change in the required torque transfer capacity Tk is large as described above. Therefore, in the present embodiment, the mode control unit 46 calculates the required motor torque Trn by using the torque transfer capacity Tke estimated by the first clutch control unit 44. That is, the mode control unit 46 sets the required motor torque Tm according to the following formula (2).

$$Tm = Ti + Tke \qquad (2)$$

By calculating the required motor torque Tm by using the torque transfer capacity Tke estimated taking into account the response delay as described above, a control accuracy of the actual torque relative to the set value of the required input shaft torque Ti can be improved, and thus, the torque shock can be reduced. Because the response delay of the hydraulic pressure supplied to the first clutch CL1 is large as described above, the effect of reducing the torque shock is large. Particularly, there is a large difference between the required torque transfer capacity Tk and the actual torque transfer capacity during the dead time delay occurring when the hydraulic pressure rises from zero. Therefore, the effect of reducing the torque shock is large. Because the torque shock at the rise of the hydraulic pressure can be reduced, the first target value Tk1 of the required torque transfer capacity Tk can be set to a large value, thereby enabling to increase the acceleration of the rotational speed of the engine E, and thus to quicken the rise of the rotational speed of the engine E. Consequently, the period of shifting from the electric drive mode to the parallel mode can be shortened, thereby enabling to improve a speed of response to the acceleration request by the driver, and so on.

3-4-4-3. Full Engagement of First Clutch CL1

After the rotational speed of the engine E is synchronized with the rotational speed of the rotary electric machine MG and before starting the combustion of the engine E, the mode control unit 46 performs control so as to increase the torque transfer capacity of the first clutch CL1 to be equal to or more than the magnitude of the torque output from the engine E after starting the combustion of the engine E.

First of all, the mode control unit 46 performs synchronization determination to determine whether or not the rotational speed of the engine E is synchronized with the rotational speed of the rotary electric machine MG. The mode control unit 46 determines that the synchronization is achieved when the differential rotational speed ΔW and the acceleration of the differential rotational speed ΔW have become sufficiently small. In the present embodiment, it is determined that the synchronization is achieved, when the differential rotational speed ΔW reaches a predetermined value ΔW 2 or less and the acceleration of the differential rotational speed ΔW reaches a predetermined value or less (at time t14 in FIG. 3).

When it is determined that the synchronization is achieved, the mode control unit 46 increases the required torque transfer capacity Tk of the first clutch CL1 to a full engagement capacity. In the present embodiment, the full engagement capacity is set to a value larger than maximum torque producible by the engine E. For example, the full engagement capacity is set to a value obtained by multiplying the maximum output torque of the engine E by a predetermined factor of safety.

In the present embodiment, when the actual torque transfer capacity reaches the required torque transfer capacity Tk after being increased, the mode control unit 46 determines that the first clutch CL1 is fully engaged, and then, starts the combustion of the engine E. More specifically, the mode control unit 46 determines that the first clutch CL1 is fully engaged, when a difference between the required torque transfer capacity Tk after being increased and the estimated torque transfer capacity Tke reaches a predetermined value or less (at time 15 in FIG. 3). Alternatively, the mode control unit 46 may determine that the first clutch CL1 is fully engaged, after a predetermined length of time after increasing the required torque transfer capacity Tk of the first clutch CL1 to the full engagement capacity. Then, the mode control unit 46 transmits, to the engine control unit 41, a command to start the combustion of the engine E. The engine control unit 41 starts supplying the fuel to the engine E via the fuel supply device 35, and starts the ignition of the fuel supplied to the engine E via the ignition coil 36, as described above.

When it is determined that the first clutch CL1 is fully engaged, the mode control unit 46 also increases the required engine torque Te from zero. The mode control unit 46 sets the required engine torque Te according to a method of setting the required engine torque Te after the transition to the parallel mode. That is, the mode control unit 46 sets the required engine torque Te so as to match the value obtained by summing the required engine torque Te and the required motor torque Tm to be set after the transition to the parallel mode with the required input shaft torque Ti. In the example shown in FIG. 3, because of setting the required motor torque Tm to zero after the transition to the parallel mode (at time t16 and later in FIG. 3), the mode control unit 46 sets the required engine torque Te to a value equal to the required input shaft torque Ti.

As described above, the engine control unit 41 controls the engine E so that the output torque of the engine E matches with the required engine torque Te commanded. As described above, the output torque of the engine E tracks the change in the required engine torque Te with a relatively large magnitude of response delay. The engine control unit 41 estimates the output torque of the engine E changing with the response delay, and transmits the estimated value to the mode control unit 46, as described above.

After the differential rotational speed ΔW of the first clutch CL1 decreases so that it is determined that the synchronization is achieved (at time t14 and later in FIG. 3), the mode control unit 46 sets the required motor torque Tm so as to make the sum of the estimated output torque of the engine E and the required motor torque Tm equal to the required input shaft torque Ti. That is, the required motor torque Tm is set to a value obtained by subtracting the estimated output torque of the engine E from the required input shaft torque Ti.

By calculating the required motor torque Tm by using the output torque of the engine E estimated taking into account the response delay as described above, the output torque of the engine. E transmitted from the engine E to the rotary electric machine MG via the first clutch CL1 can be cancelled out by the output torque of the rotary electric machine MG, after the differential rotational speed of the first clutch CL1 disappears. Because the response delay of the change in the output torque of the engine E is large as described above, the effect of reducing the torque shock is large. Particularly, after starting the combustion of the engine E and increasing the required torque transfer capacity Tk, there is a large difference between the required engine torque Te and the actual output torque. Therefore, the effect of reducing the torque shock is large. Because the torque shock at the start of the combustion of the engine can be reduced, the required engine torque Te can be increased by a large amount, thereby enabling to quicken the rising of the output torque of the engine E. Consequently, the period of shifting from the electric drive mode to the parallel mode can be shortened, and acceleration can be achieved by raising the output torque of the engine E with a good response, thereby enabling to improve the speed of response to the acceleration request by the driver, and so on.

Moreover, as described heretofore, in the parallel transition mode, control is performed so as to produce no torque shock in the torque transmitted from the input shaft Ito the wheels W side, when the combustion of the engine E is started and when the first clutch CL1 is engaged. Therefore, in the parallel transition mode, even if the lock-up clutch LC is placed in the fully engaged state in which no slip occurs between the input and the output members of the torque converter TC, the torque shock transmitted to the wheels W can be suppressed, as in the present embodiment. In other words, according to the present embodiment, in the parallel transition mode, the lock-up clutch LC can be controlled so as to be maintained in the fully engaged state. Thereby, even in the parallel transition mode, the transmission efficiency of the torque converter TC can be increased, and, even if the required input shaft torque Ti is changed due to the acceleration request by the driver, and so on, the torque output from the input shaft I to the wheel W side can be made to track the change in the required input shaft torque Ti with a good response, by changing the output torque of the rotary electric machine MG. Consequently, even in the parallel transition mode, the speed of response to the acceleration request by the driver, and so on can be prevented from decreasing. Note that, in the parallel transition mode, it is possible to control the lock-up clutch LC to be released, or control the lock-up clutch LC in a slipping manner.

When the estimated output torque of the engine E reaches the required engine torque Te (at time t16 in FIG. 3), the mode control unit 46 determines that a transition to the parallel mode is completed, then changes the operation mode from the parallel transition mode to the parallel mode, and terminates the control for the parallel transition mode. Alternatively, the mode control unit 46 may determine that a transition to the parallel mode is completed, after a predetermined length of time after the start of the combustion of the engine E.

3-4-4-4. Procedures of Control Processes in Parallel Transition Mode

Figure 6:
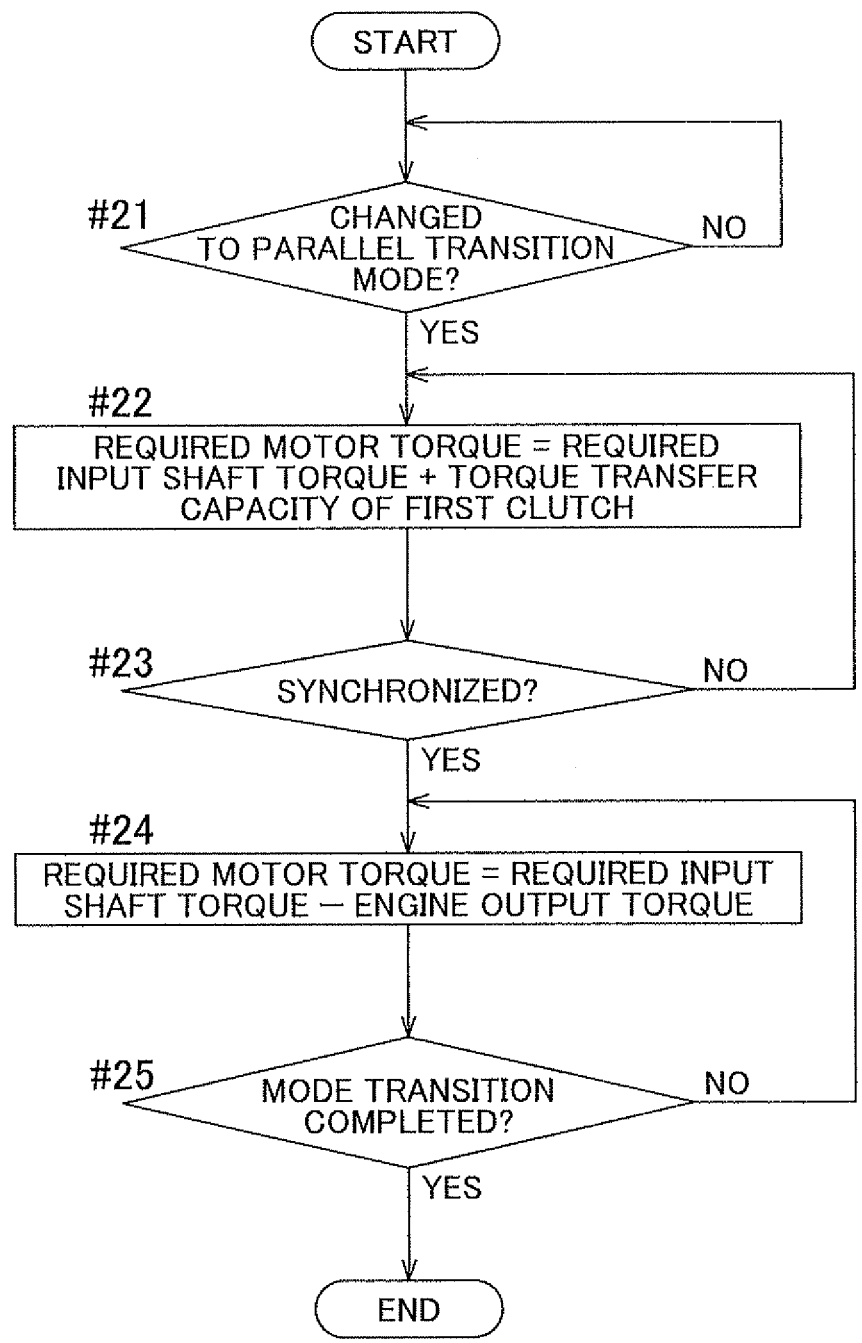
FIG. 6 is a flow chart showing a process of the control device according to the first embodiment of the present invention.
Figure 7:
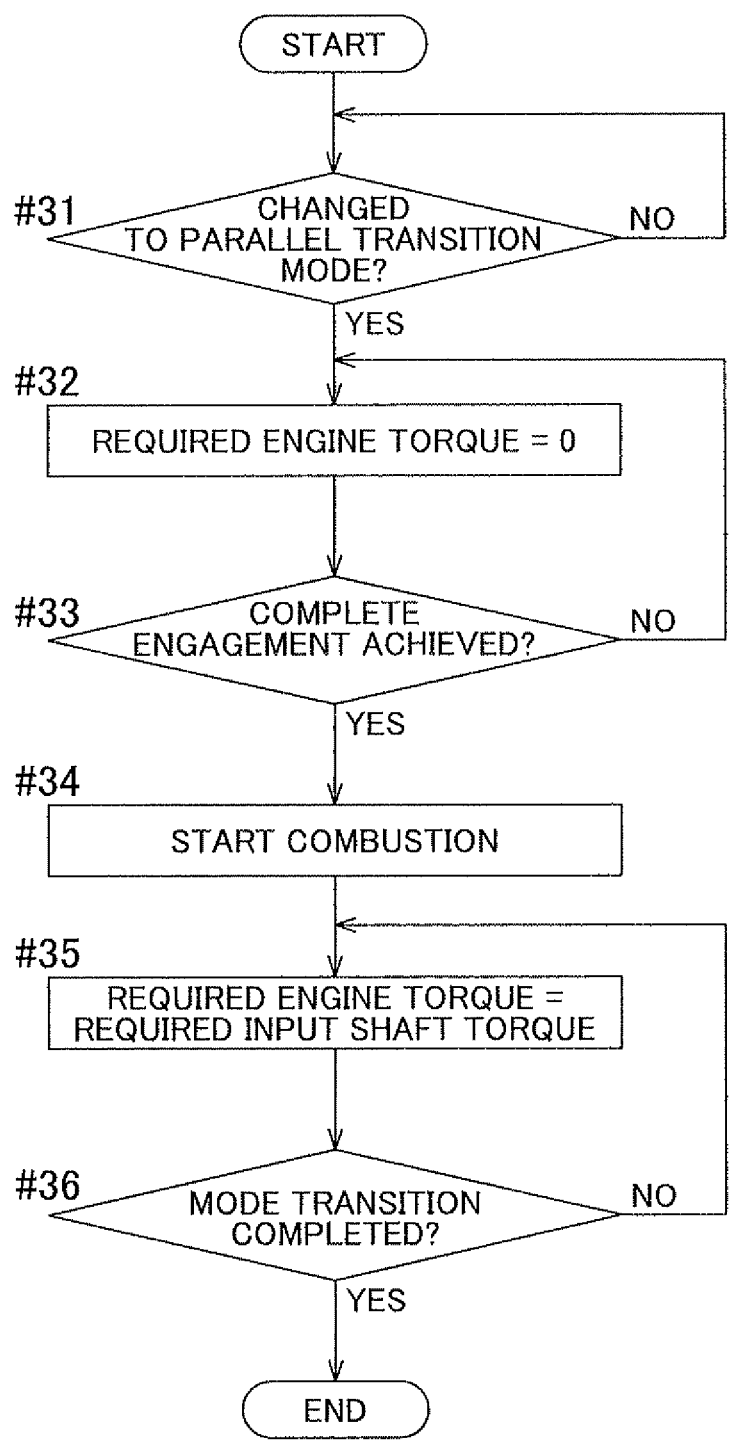
FIG. 7 is a flow chart showing a process of the control device according to the first embodiment of the present invention.

Next, description will be made of the control processes in the parallel transition mode according to the present embodiment with reference to flow charts in FIGS. 5 to 7. The functional units of the control device 1 execute processing procedures described below.

Figure 5:
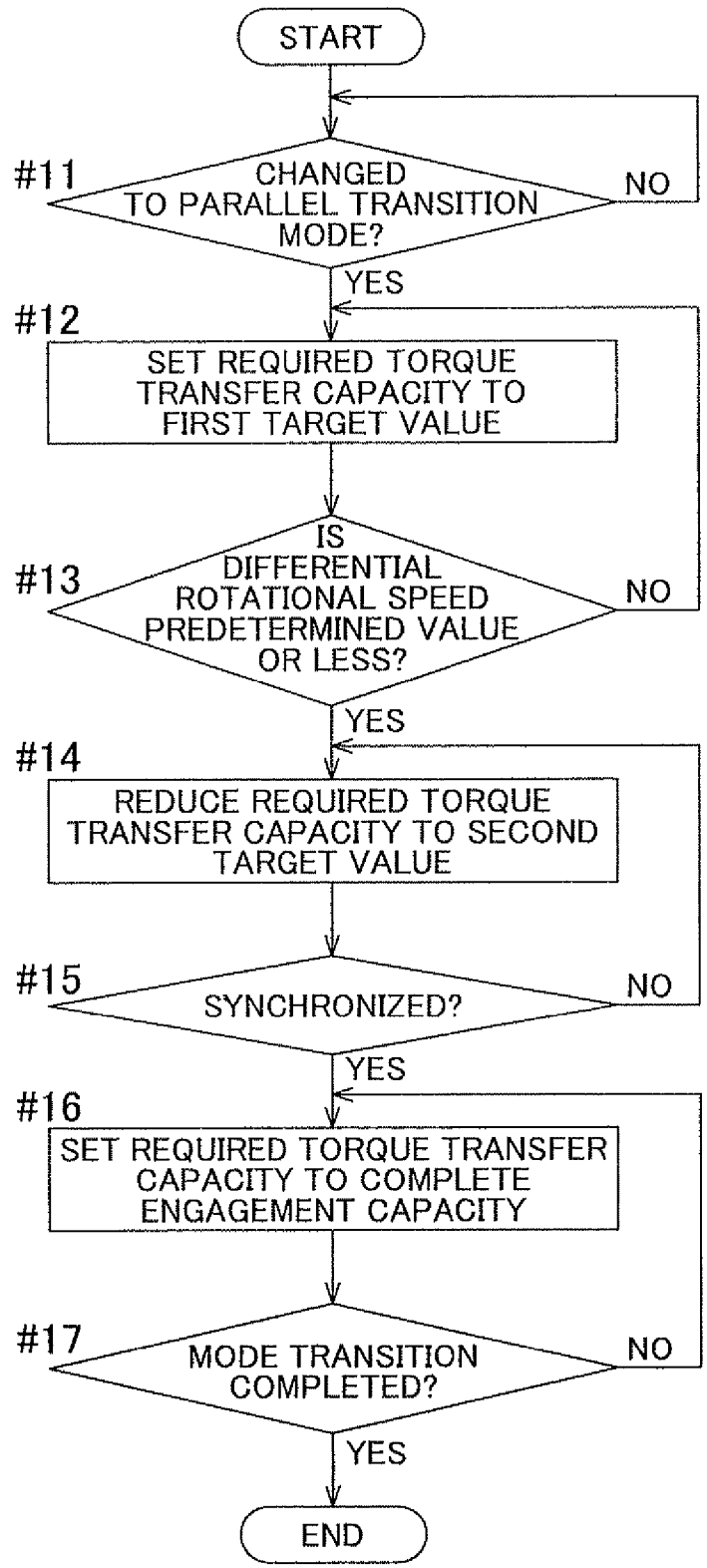
FIG. 5 is a flow chart showing a process of the control device according to the first embodiment of the present invention.

FIG. 5 is a flow chart showing a processing procedure of control that controls the engagement state of the first clutch CL1 in the parallel transition mode. FIG. 6 is a flow chart showing a processing procedure of control that controls the output torque of the rotary electric machine MG in the parallel transition mode. FIG. 7 is a flow chart showing a processing procedure of control that controls the output torque and the combustion state of the engine E in the parallel transition mode. Note that, in the description below, the vehicle is running in the electric drive mode in the initial state.

First of all, the flow chart shown in FIG. 5 will be described. The mode control unit 46 first performs the process to determine the operation mode as described above. If the operation mode is changed to the parallel transition mode (step #11: Yes), the mode control unit 46 performs the process, as described above, to set the required torque transfer capacity Tk to the first target value Tk1, and then, to control the torque transfer capacity of the first clutch CL1 via the first clutch control unit 44 so that the torque transfer capacity of the first clutch CL1 matches with the value thus set (step #12). Thereafter, as described above, the mode control unit 46 performs the process to determine whether or not the differential rotational speed ΔW between the rotational speed of the rotary electric machine MG and the rotational speed of the engine E is the predetermined value ΔW1 or less (step #13). If the differential rotational speed ΔW is the predetermined value ΔW1 or less (step #13: Yes), the mode control unit 46 performs the process, as described above, to reduce the required torque transfer capacity Tk to the second target value Tko in accordance with reduction in the differential rotational speed ΔW (step #14). Thereafter, as described above, the mode control unit 46 determines whether or not the rotational speed of the engine E is synchronized with the rotational speed of the rotary electric machine MG (step 415). If it is determined that the synchronization is achieved (step #15: Yes), the mode control unit 46 performs the process, as described above, to set the required torque transfer capacity Tk to the full engagement capacity (step #16). Thereafter, as described above, the mode control unit 46 performs the process to determine whether or not the transition to the parallel mode is completed (step #17). If it is determined that the transition is completed (step #17: Yes), the mode control unit 46 changes the operation mode from the parallel transition mode to the parallel mode, and terminates the control for the parallel transition mode.

Next, the flow chart shown in FIG. 6 will be described. First of all, if the operation mode is changed to the parallel transition mode (step #21: Yes), the mode control unit 46 performs the process, as described above, to set the required motor torque Tm to the sum of the required input shaft torque Ti and the torque transfer capacity Tke of the first clutch CL1 estimated by the first clutch control unit 44, and then, to control the output torque of the rotary electric machine MG via the rotary electric machine control unit 42 so that the output torque of the rotary electric machine MG matches with the value thus set (step #22). Thereafter, as described above, the mode control unit 46 determines whether or not the rotational speed of the engine E is synchronized with the rotational speed of the rotary electric machine MG (step #23). If it is determined that the synchronization is achieved (step #23: Yes), the mode control unit 46 performs the process, as described above, to set the required motor torque Tm to a value obtained by subtracting the output torque of the engine E estimated by the engine control unit 41 from the required input shaft torque Ti (step #24). Thereafter, as described above, the mode control unit 46 performs the process to determine whether or not the transition to the parallel mode is completed (step #25). If it is determined that the transition is completed (step #25: Yes), the mode control unit 46 changes the operation mode from the parallel transition mode to the parallel mode, and terminates the control for the parallel transition mode.

Next, the flow chart shown in FIG. 7 will be described. First of all, if the operation mode is changed to the parallel transition mode (step #31: Yes), the mode control unit 46 performs the process, as described above, to set the required engine torque Te to zero, and then, to transmit the required engine torque Te to the engine control unit 41 (step #32). Thereafter, as described above, the mode control unit 46 determines whether or not the full engagement of first clutch CL1 is achieved (step #33). If it is determined that the full engagement is achieved (step #33: Yes), the mode control unit 46 performs the process, as described above, to start the combustion of the engine E via the engine control unit 41 (step #34). Subsequently, as described above, the mode control unit 46 performs the process to set the required engine torque Te to a value equal to the required input shaft torque Ti, and then, to control the output torque of the engine E via the engine control unit 41 so that the output torque of the engine E matches with the value thus set (step #35). Thereafter, as described above, the mode control unit 46 performs the process to determine whether or not the transition to the parallel mode is completed (step #36). If it is determined that the transition is completed (step #36: Yes), the mode control unit 46 changes the operation mode from the parallel transition mode to the parallel mode, and terminates the control for the parallel transition mode.

4. Second Embodiment

Figure 8:
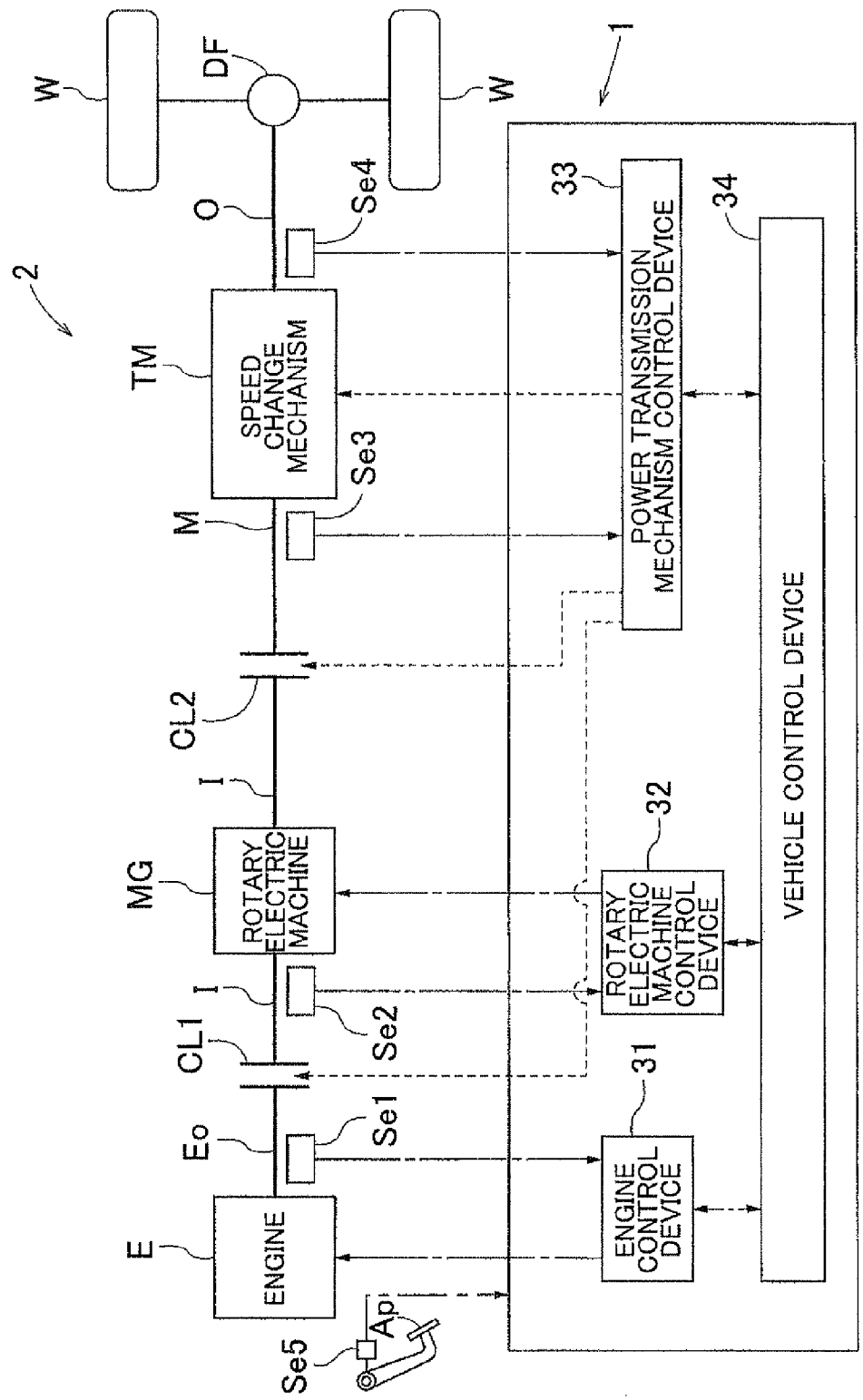
FIG. 8 is a schematic diagram showing a structure of a hybrid vehicle drive apparatus and a control device according to a second embodiment of the present invention.

A second embodiment of a control device 1 according to the present invention will be described based on the accompanying drawing. FIG. 8 is a schematic diagram showing an outline structure of a drive apparatus 2 according to the present embodiment. The drive apparatus 2 according to the present embodiment includes, instead of the torque converter TC of the first embodiment, a second clutch CL2 selectively drivingly connecting the rotary electric machine MG with the speed change mechanism TM, which is different from the first embodiment. Along with that, structures and control contents of functional units provided in the control device 1 also partially differ from those of the first embodiment. Other structures are basically the same as those of the first embodiment. The drive apparatus 2 and the control device 1 according to the present embodiment will be described below, mainly focusing on the differences from those of the first embodiment. Note that points not particularly mentioned are the same as those of the first embodiment.

4-1. Second Clutch

In the present embodiment, the input shaft I drivingly connected to the rotary electric machine MG is selectively drivingly connected to an intermediate shaft M by the second clutch CL2. The intermediate shaft M is, in turn, drivingly connected to the input side of the speed change mechanism TM. In the present embodiment, the second clutch CL2 is a similar friction engagement element to the first clutch CL1, and structured so as to be engaged or released by a hydraulic pressure supplied thereto. For example, a wet-type multi-plate clutch or a dry-type clutch is suitably used as such a clutch.

4-2. Second Clutch Control Unit

The power transmission mechanism control device 33 is provided, instead of the lock-up clutch control unit 45 of the first embodiment, with a second clutch control unit that is similar to the first clutch control unit 44.

The second clutch control unit is a functional unit that controls the second clutch CL2. The second clutch control unit controls the second clutch CL2 so as to be engaged or released, by controlling the hydraulic pressure supplied to the second clutch CL2 via the hydraulic control device.

In the present embodiment, similarly to the first clutch control unit 44, the second clutch control unit controls the hydraulic pressure supplied to the second clutch CL2 via the hydraulic control device, based on a required torque transfer capacity Tk2 commanded by the mode control unit 46 provided in the vehicle control device 34, so that an actual torque transfer capacity of the second clutch CL2 matches with the required torque transfer capacity Tk2.

The second clutch control unit performs a process to estimate the actual torque transfer capacity of the second clutch CL2 based on the required torque transfer capacity Tk2 thus commanded, taking into account a response delay, similarly to the first clutch control unit 44. Then, the second clutch control unit performs a process to transmit the estimated value of the torque transfer capacity to the other control devices 31 to 34 such as the vehicle control device 34.

4-3. Mode Control Unit

In the present embodiment, the required input shaft torque Ti calculated by the mode control unit 46 serves as a target value of the torque transmitted from the input shaft connected with the sources of driving force to the second clutch CL2.

If the second clutch CL2 is in a fully engaged state, the mode control unit 46 calculates, from the required output shaft torque, the required input shaft torque Ti, based on the speed ratio of the shift speed established in the speed change mechanism TM. If the second clutch CL2 is in an engagement state in which a slip occurs between the input and the output members, the mode control unit 46 calculates the required input shaft torque Ti, based on the speed ratio of the shift speed established in the speed change mechanism TM and on the torque transfer capacity of the second clutch CL2.

In the present embodiment, when the operation mode is calculated to be the parallel transition mode, the mode control unit 46 sets the required torque transfer capacity Tk2 of the second clutch CL2 to a value larger than the required input shaft torque Ti so as to achieve the fully engaged state, and issues the value as a command to the second clutch control unit.

As described in the first embodiment, according to the present invention, the control is performed in the parallel transition mode so as to produce no torque shock in the torque transmitted from the input shaft I to the wheels W side, when the combustion of the engine E is started and when the first clutch CL1 is engaged. Therefore, even if the second clutch CL2 is placed in the fully engaged state so as not to perform the slip control and the like, the torque shock transmitted to the wheels W can be suppressed. In other words, according to the present embodiment, in the parallel transition mode, the second clutch CL2 can be controlled so as to be maintained in the fully engaged state. Thereby, even in the parallel transition mode, a transmission efficiency of the second clutch CL2 can be increased, and, even if the required input shaft torque Ti is changed by the acceleration request by the driver, and so on, the torque output from the input shaft I to the wheel W side can be made to track the change in the required input shaft torque Ti with a good response, by changing the output torque of the rotary electric machine MG. Consequently, even in the parallel transition mode, the speed of response to the acceleration request by the driver, and so on can be improved. Note that, in the parallel transition mode, the second clutch CL2 can also be controlled in a slipping manner.

5. Third Embodiment

Figure 9:
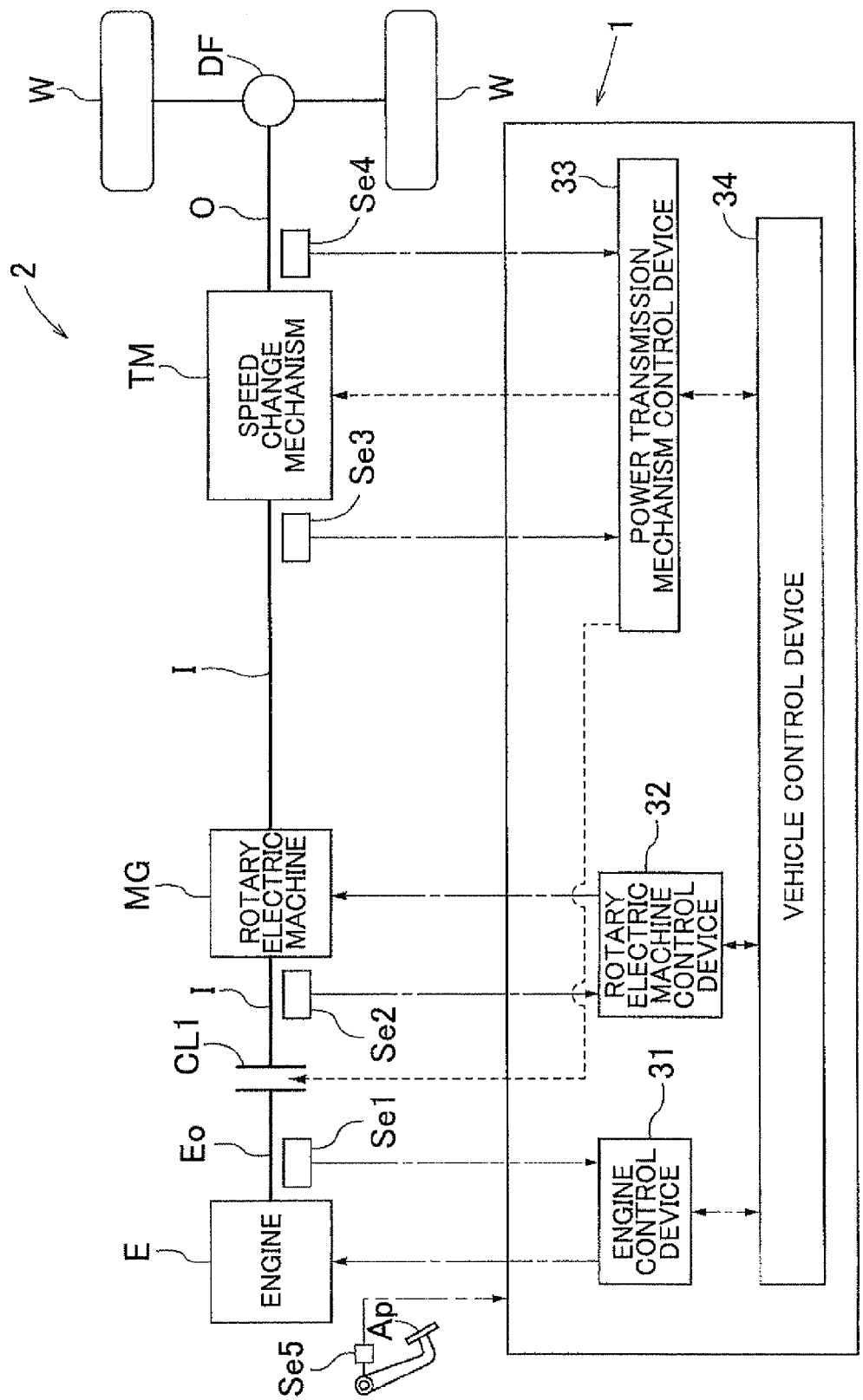
FIG. 9 is a schematic diagram showing a structure of a hybrid vehicle drive apparatus and a control device according to a third embodiment of the present invention.

A third embodiment of a control device 1 according to the present invention will be described based on the accompanying drawing. FIG. 9 is a schematic diagram showing an outline structure of a drive apparatus 2 according to the present embodiment. As the difference from the first and second embodiments, the drive apparatus 2 according to the present embodiment does not include the torque converter TC of the first embodiment nor the second clutch CL2 and the intermediate shaft M of the second embodiment, and in the drive apparatus 2 of the third embodiment, the input shaft T is directly drivingly connected to the speed change mechanism TM. Structures and control contents of functional units provided in the control device 1 also partially differ from those of the first and the second embodiments in accordance with the differences as described above. Other structures are basically the same as those of the first and the second embodiments. The drive apparatus 2 and the control device 1 according to the present embodiment will be described below, mainly focusing on the differences from those of the first and the second embodiments. Note that points not particularly mentioned are the same as those of the first and the second embodiments.

In the present embodiment, the power transmission mechanism control device 33 does not include the lock-up clutch control unit 45 of the first embodiment and the second clutch control unit of the second embodiment.

In the present embodiment, the required input shaft torque Ti calculated by the mode control unit 46 serves as a target value of the torque transmitted from the input shaft I connected with the sources of driving force to the speed change mechanism TM.

As described in the first and the second embodiments, according to the present invention, the control is performed in the parallel transition mode so as to produce no torque shock in the torque transmitted from the input shaft I to the wheels W side, when the combustion of the engine E is started and when the first clutch CL1 is engaged. Therefore, even if the input shaft I is directly connected to the speed change mechanism TM without interposing a fluid coupling or a clutch therebetween, the torque shock transmitted to the wheels W can be suppressed. This enables the torque output from the input shaft I to the wheel W side to be made to track the change in the required input shaft torque Ti with a good response by changing the output torque of the rotary electric machine MG, even if the required input shaft torque Ti is changed by the acceleration request by the driver, and so on during the parallel transition mode. Consequently, even in the parallel transition mode, the speed of response to the acceleration request by the driver, and so on can be improved.

Other Embodiments (1) The above embodiments have been described by way of examples in which the control device 1 is provided with the plurality of control devices 31 to 34, which include the plurality of functional units 41 to 46 in a distributed manner. However, embodiments of the present invention are not limited to this configuration. That is, the control device 1 may be provided with control devices formed by integrating or separating the plurality of control devices 31 to 34 in an arbitrary combination, and the distribution of the plurality of functional units 41 to 46 may also be arbitrarily established.

(2) The above embodiments have been described by way of examples in which, after the differential rotational speed ΔW that is the difference between the rotational speed of the engine E and the rotational speed of the rotary electric machine MG reaches the predetermined value ΔW1 or less, the mode control unit 46 synchronizes the rotational speed of the engine E with the rotational speed of the rotary electric machine while reducing the torque transfer capacity of the first clutch CL1. However, embodiments of the present invention are not limited to this. That is, it is also one of preferred embodiments of the present invention to have a structure in which, even after the differential rotational speed ΔW that is the difference between the rotational speed of the engine E and the rotational speed of the rotary electric machine MG reaches the predetermined value ΔW1 or less, the mode control unit 46 synchronizes the rotational speed of the engine E with the rotational speed of the rotary electric machine while maintaining the torque transfer capacity of the first clutch CL1 at a constant value so as not to be reduced, or increasing the torque transfer capacity of the first clutch CL1.

(3) The above embodiments have been described by way of examples in which, after the rotational speed of the engine E is synchronized with the rotational speed of the rotary electric machine MG and before the combustion of the engine E is started, the mode control unit 46 performs the control so as to increase the torque transfer capacity of the first clutch CL1 to be equal to or more than the magnitude of torque output from the engine E after starting the combustion of the engine E. However, embodiments of the present invention are not limited to this. That is, it is also one of preferred embodiments of the present invention to have a structure in which the mode control unit 46 performs control so as to increase the torque transfer capacity of the first clutch CL1 to be equal to or more than the magnitude of torque output from the engine E after starting the combustion of the engine E, after the rotational speed of the engine E is synchronized with the rotational speed of the rotary electric machine MG and at the same time as, or after, the time when the combustion of the engine E is started.

(4) The above embodiments have been described by way of examples in which the mode control unit 46 performs the control so that the torque transfer capacity of the first clutch CL1 when the rotational speed of the engine E is synchronized with the rotational speed of the rotary electric machine MG matches with the magnitude of the output torque of the engine E before starting combustion. However, embodiments of the present invention are not limited to this. That is, it is also one of preferred embodiments of the present invention to have a structure in which the mode control unit 46 performs control so that the torque transfer capacity of the first clutch CL1, when the rotational speed of the engine E is synchronized with the rotational speed of the rotary electric machine MG, is larger or smaller by a predetermined value than the magnitude of the output torque of the engine E before starting combustion.

The present invention can preferably be used for a control device that controls a hybrid vehicle drive apparatus provided with an internal combustion engine, a rotary electric machine drivingly connected to wheels, and a clutch selectively drivingly connecting the internal combustion engine with the rotary electric machine.

What is claimed is:

1. A control device controlling a hybrid vehicle drive apparatus that includes an internal combustion engine, a rotary electric machine drivingly connected to a wheel and a clutch selectively drivingly connecting the internal combustion engine with the rotary electric machine, wherein
the control device performs control such that, when a start request of the internal combustion engine is issued in a state in which the clutch is released and combustion of the internal combustion engine is stopped, a rotational speed of the internal combustion engine is raised to a rotational speed of the rotary electric machine by transmitting driving torque of the rotary electric machine to the internal combustion engine by increasing a torque transfer capacity of the clutch, and, after the rotational speed of the internal combustion engine is synchronized with the rotational speed of the rotary electric machine, the combustion of the internal combustion engine is started, and
wherein the control device synchronizes the rotational speed of the internal combustion engine with the rotational speed of the rotary electric machine while reducing the torque transfer capacity of the clutch, after a difference between the rotational speed of the internal combustion engine and the rotational speed of the rotary electric machine reaches a predetermined value or less.

2. The control device according to claim 1, wherein the control device performs control so as to increase the torque transfer capacity of the clutch to be equal to or more than a magnitude of a torque output from the internal combustion engine after starting the combustion of the internal combustion engine, after the rotational speed of the internal combustion engine is synchronized with the rotational speed of the rotary electric machine and before the combustion of the internal combustion engine is started.

3. A control device controlling a hybrid vehicle drive apparatus that includes an internal combustion engine, a rotary electric machine drivingly connected to a wheel and a clutch selectively drivingly connecting the internal combustion engine with the rotary electric machine, wherein
the control device performs control such that, when a start request of the internal combustion engine is issued in a state in which the clutch is released and combustion of the internal combustion engine is stopped, a rotational speed of the internal combustion engine is raised to a rotational speed of the rotary electric machine by transmitting driving torque of the rotary electric machine to the internal combustion engine by increasing a torque transfer capacity of the clutch, and, after the rotational speed of the internal combustion engine is synchronized with the rotational speed of the rotary electric machine, the combustion of the internal combustion engine is started, and
wherein the control device performs control so as to match the torque transfer capacity of the clutch when the rotational speed of the internal combustion engine is synchronized with the rotational speed of the rotary electric machine with driven torque of the internal combustion engine before starting the combustion of the internal combustion engine.

\* \* \* \* \*